US010122485B2

(12) United States Patent
Yoshimochi et al.

(10) Patent No.: US 10,122,485 B2
(45) Date of Patent: Nov. 6, 2018

(54) SIGNAL PROCESSING APPARATUS AND SIGNAL PROCESSING METHOD

(71) Applicant: SONY CORPORATION, Tokyo (JP)

(72) Inventors: Naoki Yoshimochi, Kanagawa (JP); Satoshi Okada, Tokyo (JP); Misa Nakane, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 174 days.

(21) Appl. No.: 15/037,739

(22) PCT Filed: Nov. 17, 2014

(86) PCT No.: PCT/JP2014/080319
§ 371 (c)(1),
(2) Date: May 19, 2016

(87) PCT Pub. No.: WO2015/079943
PCT Pub. Date: Jun. 4, 2015

(65) Prior Publication Data
US 2016/0301489 A1 Oct. 13, 2016

(30) Foreign Application Priority Data

Nov. 27, 2013 (JP) ................. 2013-244954

(51) Int. Cl.
H04J 3/00 (2006.01)
H04B 7/08 (2006.01)
(Continued)

(52) U.S. Cl.
CPC .............. *H04J 3/0658* (2013.01); *H04B 7/08* (2013.01); *H04W 4/06* (2013.01); *H04W 56/001* (2013.01);
(Continued)

(58) Field of Classification Search
None
See application file for complete search history.

(56) References Cited

U.S. PATENT DOCUMENTS

2007/0071118 A1* 3/2007 Sydir ................. H04K 1/00
375/260
2009/0154424 A1* 6/2009 Oyabu ................. H04W 36/38
370/331
(Continued)

FOREIGN PATENT DOCUMENTS

JP 2001-086089 A 3/2001
JP 2004-007169 A 1/2004
(Continued)

*Primary Examiner* — Diane Lo
(74) *Attorney, Agent, or Firm* — Chip Law Group

(57) ABSTRACT

The present technology relates to a signal processing apparatus, a signal processing method, and a program capable of reducing the number of pins for transmitting and receiving data. The signal processing apparatus is provided with a signal transmission unit configured to perform classification for a signal to be transmitted and received between processing units that process an obtained signal, perform time division multiplexing for the signal classified into a group, and transmit the signal. The classification is performed depending on at least one feature of an update period, an update timing, and a tolerable transmission delay of the signal. Further, the signal belonging to the group is subjected to time division multiplexing in such a manner that the transmission is completed within the update period, the transmission is completed within a range of the tolerable delay, and the transmission is performed with a minimum number of pins. The present technology can be applied to a reception apparatus that receives and processes airwaves.

13 Claims, 12 Drawing Sheets

(51) Int. Cl.
*H04W 4/06* (2009.01)
*H04W 56/00* (2009.01)
*H04J 11/00* (2006.01)
*H04J 3/06* (2006.01)

(52) U.S. Cl.
CPC ............ *H04J 2011/0013* (2013.01); *H04J 2011/0096* (2013.01)

(56) References Cited

U.S. PATENT DOCUMENTS

2009/0220017 A1* 9/2009 Kawamura ............ H04L 5/005
 375/260
2011/0292250 A1* 12/2011 Nakajima ............ H04N 21/236
 348/239

FOREIGN PATENT DOCUMENTS

| JP | 2006-054597 A | 2/2006 |
| JP | 2009-188874 A | 8/2009 |
| JP | 2013-135270 A | 7/2013 |

* cited by examiner

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2014/080319 filed on Nov. 17, 2014, which claims priority benefit of Japanese Patent Application No. JP 2013-244954 filed in the Japan Patent Office on Nov. 27, 2013. Each of the above-referenced applications is hereby incorporated herein by reference in its entirety.

TECHNICAL FIELD

The present technology relates to a signal processing apparatus, a signal processing method, and a program. Specifically, the present technology relates to a signal processing apparatus, a signal processing method, and a program appropriate to improve performance in reception with a use of diversity.

BACKGROUND ART

Some image display apparatuses having displays such as televisions and mobile terminal apparatuses are provided with reception apparatuses each having a plurality of antennas (see, for example, Patent Document 1).

Existing technologies pursue improvement of quality and reliability of communication for signals that are identical to those received through a plurality of antennas, by primarily using signals received via an antenna having an optimal radio wave condition, by removing noise upon synthesizing the received signal, and the like. This kind of technology is called diversity.

Patent Document 1: Japanese Patent Application Laid-open No. 2013-135270

SUMMARY OF INVENTION

Problem to be Solved by the Invention

To achieve diversity, the following has been proposed: a plurality of antennas is respectively provided with an LSI (Large Scale Integration), signals received via the plurality of antennas are processed, and synthesis or selection is performed therefor. When the plurality of LSIs is provided, if a great number of signals has to be transmitted between the LSIs, the number of transmission pins or reception pins is increased, which may cause an increase in cost of a reception apparatus. In view of this, the configuration in which the number of pins is decreased is being demanded.

Further, equality of the phases of clocks is not assured between the multiple LSIs, so it is necessary to perform an appropriate operation to reliably transmit signals that have to be transmitted.

Furthermore, in the case where one LSI is used to form the LSI that achieves diversity, this serves as an LSI for diversity and cannot be used for a reception apparatus that does not adopt diversity, or may cause a redundant structure if used therefor. Thus, if the LSI that achieves diversity is formed by one LSI, versatility is deteriorated.

However, in order to reduce the cost, using a versatile LSI is good, and it is desirable that an LSI can be used not only for a reception apparatus having a diversity configuration but also for a reception apparatus having no diversity configuration. In view of this, as described above, it is conceived that an LSI that processes a signal received via one antenna is provided to each of antennas, thereby forming a reception apparatus having the diversity configuration. However, providing a plurality of LSIs may increase cost as described above.

In view of the circumstances as described above, the present technology has been made and makes it possible to provide an LSI appropriate to diversity.

Means for Solving the Problem

According to an embodiment of the present technology, there is provided a first signal processing apparatus including a signal transmission unit configured to perform classification for a signal to be transmitted and received between processing units that process an obtained signal, perform time division multiplexing for the signal in a group obtained by the classification, and transmit the signal.

The classification can be performed depending on at least one feature of an update period, an update timing, a tolerable transmission delay of the signal.

The signal belonging to the group can be subjected to time division multiplexing in such a manner that transmission is completed within an update period, transmission is completed within a range of tolerable delay, and transmission is performed with a minimum number of pins.

Out of signals belonging to different groups, signals that are transmitted within an update period and within a range of a tolerable delay can be subjected to time division multiplexing and transmitted with the same pin.

The group obtained by the classification may include a first group including an enable signal, a second group to which a signal synchronized with the enable signal belongs, a third group to which a signal a period of which is changed at an irregular interval belongs, and a fourth group to which a signal a period of which is not basically changed belongs.

The group obtained by the classification may include a first group including an enable signal, a second group which includes data and a start flag of each sub carrier of OFDM, and to which a signal that requires several thousand data transmissions in one symbol of OFDM belongs, a third group to which a signal that indicates an internal state belongs, and a fourth group to which a signal that indicates a broadcasting parameter belongs.

The signal belonging to the first group can be transmitted with one pin, the signal belonging to the second group can be transmitted with a predetermined number of pins, the signal belonging to the third group and the signal belonging to the fourth signal can be transmitted with the same predetermined number of pins.

The signal can be transmitted between the processing units in a single direction, and the clock can be transmitted between the processing units in a single direction.

The signal can be transmitted between the processing units bidirectionally, and the clock can be transmitted between the processing units bidirectionally.

The signal can be transmitted between the processing units bidirectionally, and the clock can be transmitted between the processing units in a single direction.

The processing units can be operated by a clock from a clock generation unit that is disposed outside the processing units, generates the clock, and supplies the clock to the processing units.

A second processing unit configured to receive the signal that is transmitted from a first processing unit and has been subjected to the time division multiplexing can change clocks from a clock transmitted from the first processing unit to a clock generated by the second processing unit and process the signal transmitted from the first processing unit.

According to an embodiment of the present technology, there is provided a signal processing method, including the steps of: performing classification for a signal to be transmitted and received between processing units that process an obtained signal; and performing time division multiplexing for the signal in a group obtained by the classification and transmitting the signal.

According to an embodiment of the present technology, there is provided a program for causing a computer to execute the steps of: performing classification for a signal to be transmitted and received between processing units that process an obtained signal; and performing time division multiplexing for the signal in a group obtained by the classification and transmitting the signal.

In the first signal processing apparatus, the signal processing method, and the program according to the embodiments of the present technology, the signal to be transmitted and received between the processing units that process the obtained signal is classified, and the signal classified in the group is subjected to time division multiplexing and transmitted.

According to an embodiment of the present technology, there is provided a second signal processing apparatus, including: a transmission unit configured to transmit data to a processing unit having the same structure; and a reception unit configured to receive data from a processing unit having the same structure, in which the transmission unit includes a transmission data generation unit configured to perform time division multiplexing for data to be transmitted and generate a first transmission data, a clock generation unit configured to generate a clock, and a first synchronization unit configured to synchronize the first transmission data generated by the transmission data generation unit with the clock and transmit the data to the processing unit, and the reception unit includes a second synchronization unit configured to synchronize a second transmission data that has been subjected to time division multiplexing with a clock supplied from the processing unit, a changing unit configured to change clocks from the clock from the processing unit to the clock generated by the clock generation unit, and a transmission data restoration unit configured to demultiplex the second transmission data that has been subjected to time division multiplexing and clock changing by the changing unit, and restore the data.

In the second signal processing apparatus according to the embodiment of the present technology, the transmission unit configured to transmit the data to the processing unit having the same structure and the reception unit configured to receive the data. The transmission unit performs time division multiplexing for the data to be transmitted, generates the first transmission data, generate the clock, causes the first transmission data generated to be synchronized with the clock, and transmits the data to the processing unit. The reception unit causes the second transmission data that has been subjected to time division multiplexing to be synchronized with the clock supplied from the processing unit, changes the clocks from the clock from the processing unit to the clock generated by the clock generation unit, performs demultiplexing for the signal that has been subjected to time division multiplexing for the clock-changed second transmission data, and recovers the data.

According to an embodiment of the present technology, there is provided a third signal processing apparatus, including: a transmission unit configured to transmit data to a processing unit having the same structure; and a reception unit configured to receive data from a processing unit having the same structure, in which the transmission unit includes a transmission data generation unit configured to perform time division multiplexing for data to be transmitted and generate a first transmission data, a clock generation unit configured to generate a clock, a first synchronization unit configured to synchronize the first transmission data generated by the transmission data generation unit with the clock, and a first changing unit configured to change clocks from the clock to a clock supplied from the processing unit, and transmit the first transmission data to the processing unit, and the reception unit includes a second synchronization unit configured to synchronize a second transmission data that has been subjected to time division multiplexing from the processing unit with the clock supplied from the processing unit, a second changing unit configured to change clocks from the clock from the processing unit to the clock generated by the clock generation unit, and a transmission data restoration unit configured to demultiplex the second transmission data that has been subjected to time division multiplexing and clock changing by the changing unit, and restore the data.

In the third signal processing apparatus according to the embodiment of the present technology, the transmission unit configured to transmit the data to the processing unit having the same structure and the reception unit configured to receive the data are provided. The transmission unit performs time division multiplexing for the data to be transmitted, generates the first transmission data, generates the clock, causes the first transmission data generated to be synchronized with the clock, changes the clocks from the generated clock to the clock supplied from the processing unit, and transmits the first transmission data to the processing unit. The reception unit causes the second transmission data that has been subjected to time division multiplexing from the processing unit to be synchronized with the clock supplied from the processing unit, changes the clocks from the clock from the processing unit to the generated clock, performs demultiplexing for the signal that has been subjected to time division multiplexing for the clock-changed second transmission data, and recovers the data.

According to an embodiment of the present technology, there is provided a fourth signal processing apparatus, including: a transmission unit configured to transmit data to a processing unit having the same structure; and a reception unit configured to receive data from a processing unit having the same structure, in which the transmission unit includes a transmission data generation unit configured to perform time division multiplexing for data to be transmitted and generate a first transmission data, and a first synchronization unit configured to synchronize the first transmission data generated by the transmission data generation unit with a clock generated by a clock generation unit that is provided outside, and transmit the data to the processing unit, and the reception unit includes a second synchronization unit configured to synchronize a second transmission data that has been subjected to time division multiplexing from the processing unit with the clock generated by the clock generation unit, and a transmission data restoration unit configured to demultiplex the second transmission data that has been subjected to time division multiplexing and has been synchronized with the clock by the second synchronization unit, and restore the data.

In the fourth signal processing apparatus according to the embodiment of the present technology, the transmission unit configured to transmit the data to the processing unit having the same structure and the reception unit configured to receive the data. The transmission unit performs time division multiplexing for the data to be transmitted, generates the first transmission data, causes the first transmission data generated to be synchronized with the clock generated by the clock generation unit provided outside, and transmits the data to the processing unit. The reception unit causes the second transmission data that has been subjected to time division multiplexing from the processing unit to be synchronized with the clock generated by the clock generation unit, performs demultiplexing for the signal that has been subjected to time division multiplexing for the second transmission data synchronized with the clock, and recovers the data.

Effects

According to the embodiments of the present technology, it is possible to provide the LSI appropriate to diversity.

It should be noted that the effects described herein are not necessarily limited, and any effect described in this specification may be obtained.

MODE(S) FOR CARRYING OUT THE INVENTION

Figure 1:
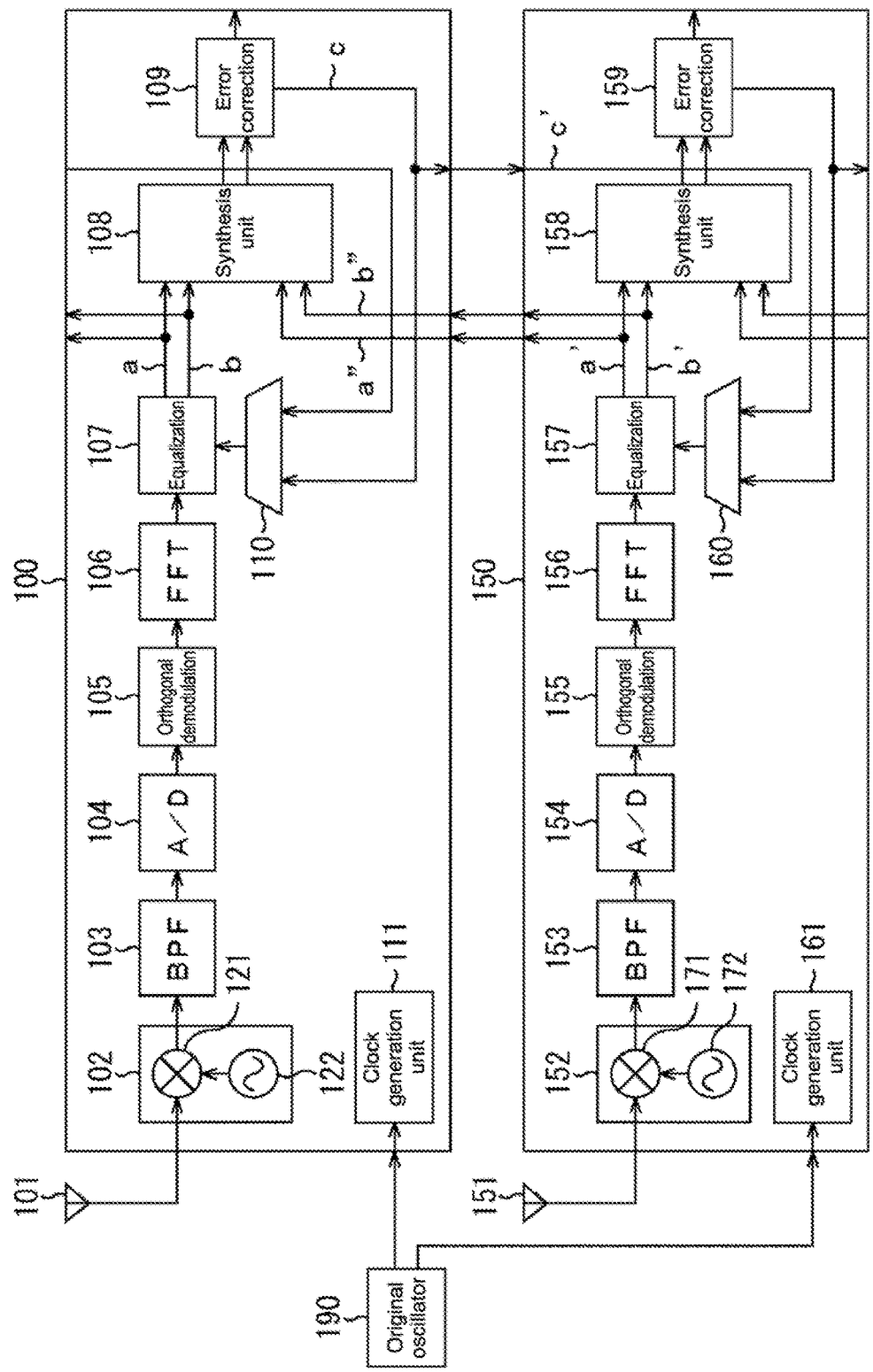
FIG. 1 A diagram showing a structural example of a reception unit.

Hereinafter, modes for carrying out the present technology (hereinafter, referred to as embodiments) will be described. It should be noted that the description will be given in the following order.
1. Structure of reception unit
2. About determination process of transmission method
3. Embodiment of transmitting clock and transmission data together
4. About single-directional transmission of clock
5. About use of common clock
6. Reception unit for bidirectional clock transmission
7. Reception unit for single-directional clock transmission
8. Reception unit for common clock
9. About recording medium <Structure of Reception Unit>

The present technology to be described below can be applied to a technology called diversity, so diversity is cited as an example for the description. Diversity is such a technology that, for signals that are identical to those received through a plurality of antennas, by primarily using signals received via an antenna having an optimal radio wave condition, by removing noise upon synthesizing the received signal, and the like, improvement of quality and reliability of communication are pursued.

Further, in order to make a difference between a signal processing unit to which the present technology is applied and a general signal processing unit clear, the general signal processing unit and an operation thereof will be described first, and then the signal processing unit to which the present technology is applied will be described. Here, the description will be continued on the assumption that the signal processing unit is included in an apparatus for obtaining and processing a predetermined signal, in the following description, a reception apparatus that receives airwaves, and is mainly as a part for processing a signal from an antenna.

FIG. 1 is a diagram showing the structure of an example of a reception unit. The reception unit shown in FIG. 1 is provided with two antennas 101 and antenna 151, and provided with an LSI 100 and an LSI 150 that process signals received via the antennas 101 and 151, respectively.

The LSI 100 is provided with a tuner 102, a BPF (band pass filter) 103, an A/D conversion unit 104, an orthogonal demodulation unit 105, an FFT (Fast Fourier Transform) computation unit 106, an equalization unit 107, a synthesis unit 108, an error correction unit 109, a selector 110, and a clock generation unit 111. Further, the tuner 102 is constituted of a multiplication unit 121 and a local oscillation unit 122.

In a similar way, the LSI 150 is provided with a tuner 152, a BPF 153, an A/D conversion unit 154, an orthogonal demodulation unit 155, an FFT computation unit 156, an equalization unit 157, a synthesis unit 158, an error correction unit 159, a selector 160, and a clock generation unit 161. Furthermore, the tuner 152 is constituted of a multiplication unit 171 and a local oscillation unit 172.

The LSI 100 is the same LSI as the LSI 150 and represents an LSI that operates in a main mode. The LSI 100 operates in synchronization with a clock generated in the clock generation unit 111 on the basis of an output of an original oscillator 190. The LSI 150 is the same LSI as the LSI 100 and represents an LSI that operates in a sub mode. The LSI 150 operates in synchronization with a clock generated in the clock generation unit 161 on the basis of an output of the original oscillator 190.

At this time, the frequency of the output clock of the clock generation unit 111 and the frequency of the output clock of the clock generation unit 161 coincide, but it is not assumed that the phases of the clocks coincide. A reception unit to which the present technology to be described later with reference to FIG. 2 and subsequent figures is applied is not also assured for the phase of a clock. However, the reception unit has the structure in which the point with no assurance is compensated, and a signal that has to be transmitted can be reliably transmitted. Note that, in the case where a common clock to be described later is used, the phase of the clock is also assured.

Airwaves from a broadcasting station are received via the antenna 101 and supplied to the tuner 102 as an RF signal. The tuner 102 is constituted of the multiplication unit 121 and the local oscillation unit 122 and performs frequency conversion for the RF signal received via the antenna 101 to an IF signal. The IF signal obtained by the tuner 102 is filtered by the band pass filter 103, then digitized by the A/D conversion unit 104, and supplied to the orthogonal demodulation unit 105.

The orthogonal demodulation unit 105 performs orthogonal demodulation for the digitized IF signal and outputs an OFDM (Orthogonal Frequency-Division Multiplexing) time domain signal. The OFDM time domain signal is supplied to the FFT computation unit 106. The FFT computation unit 106 performs FFT computation for the OFDM time domain signal and outputs an OFDM frequency domain signal. The signal output from the FFT computation unit 106 is so-called a signal in a frequency domain which has been subjected to the FFT. Therefore, the signal that has been subjected to the FFT computation is called OFDM frequency domain signal.

The OFDM frequency domain signal is supplied to the equalization unit 107. The equalization unit 107 calculates a transmission line characteristic for all sub carriers, and on the basis of this, compensates distortion due to the transmission line of the OFDM frequency domain signal, thereby obtaining an equalization signal a of the first system. At this time, the equalization unit 107 also outputs reliability information b of the first system of each equalization signal at the same time. The equalization signal a and the reliability information b are output to the synthesis unit 108.

In a similar way, the airwaves from the broadcasting station are also received via the antenna 151 and supplied to the tuner 152 as the RF signal. The tuner 152 is constituted of the multiplication unit 171 and the local oscillation unit 172 and performs frequency conversion for the RF signal received via the antenna 151 to the IF signal. The IF signal received by the tuner 152 is filtered by the band pass filter 153, then digitized by the A/D conversion unit 154, and supplied to the orthogonal demodulation unit 155.

The orthogonal demodulation unit 155 performs orthogonal demodulation for the digitized IF signal and outputs the OFDM time domain signal. The OFDM time domain signal is supplied to the FFT computation unit 156. The FFT computation unit 156 performs the FFT computation for the OFDM time domain signal and extracts and outputs data orthogonally demodulated in the sub carriers.

The FFT computation unit 156 performs the FFT computation for the OFDM time domain signal and outputs the OFDM frequency domain signal. The OFDM frequency domain signal is supplied to the equalization unit 157. The equalization unit 157 calculates a transmission line characteristic for all the sub carriers, on the basis of this, compensates distortion due to the transmission line of the OFDM frequency domain signal, thereby obtaining an equalization signal a' of the second system. At this time, the equalization unit 157 also outputs reliability information b' of the second system of each equalization signal at the same time.

The equalization signal a' of the second system and the reliability information b' of the second system are transmitted to the LSI 100 that operates in the main mode. In the LSI 100 that operates in the main mode, those are received as an equalization signal a" of the second system and reliability information b" of the second system.

The synthesis unit 108 in the LSI 100 outputs, to the error correction unit 109, the equalization signal, the quality of which is improved by synthesizing or selecting the equalization signal a of the first system and the equalization signal a" of the second system on the basis of the reliability information b of the first system and the reliability information b" of the second system, and reliability information on which a diversity gain is reflected.

The error correction unit 109 performs Viterbi decoding, diffusion signal removal, and RS decoding, and outputs decoded data. A feedback signal c output from the error correction unit 109 is input to the equalization unit 107 through the selector 110. On the other hand, the feedback signal c is also transmitted to the LSI 150 that operates in the sub mode. In the LSI 150 that operates in the sub mode, the signal is received as a feedback signal c' and supplied to the equalization unit 157 through the selector 160.

With this structure, irrespective of whether obtaining the diversity gain is assumed or not, a common LSI can be used. In a system that does not have to obtain the diversity gain, one LSI as described above is applied (one of the LSI 100 and the LSI 150 is used), thereby making it possible to suppress an increase in cost of the reception apparatus. Further, in a system that requires to obtain the diversity gain, the two LSIs as described above are applied (the LSI 100 and the LSI 150 are used), thereby making it possible to obtain diversity.

On the other hand, in the case where there are a great number of signals that have to be transmitted between the LSI 100 and the LSI 150, the numbers of pins for the reception and pins for the transmission are increased, which leads to an increase in cost of the LSI. For this reason, it is necessary to suppress the numbers of pins for the reception and pins for the transmission. For example, pins for receiving the equalization signal a" of the second system supplied from the LSI 150 to the LSI 100, pins for receiving the reliability information a" of the second system, and pins for receiving the feedback signal c' supplied from the LSI 100 to the LSI 150 are necessary, and the number of pins is required to correspond to data volume.

Further, because it is not assured that the phases of the clocks coincide between the LSI 100 and the LSI 150, it is necessary to reliably transmit signals that have to be transmitted by taking appropriate measures.

As described above, in a system that requires obtaining the diversity gain with the use of the plurality of LSIs, if there is a great number of signals required for the transmission between the LSIs, the numbers of pins for the reception and pins for the transmission are increased, leading to the increase in the cost of the reception unit. For this reason, it is necessary to suppress the numbers of pins for the reception and pins for the transmission. Further, because the equality of the phases of the clocks is not assured between the multiple LSIs, it is necessary to reliably transmit the signals that have to be transmitted.

In view of this, a technology for making it possible to reliably transmit the signals that have to be transmitted, while suppressing the numbers of pins for the reception and pins for the transmission will be described below.

<About Determination Process of Transmission Method>

Figure 2:
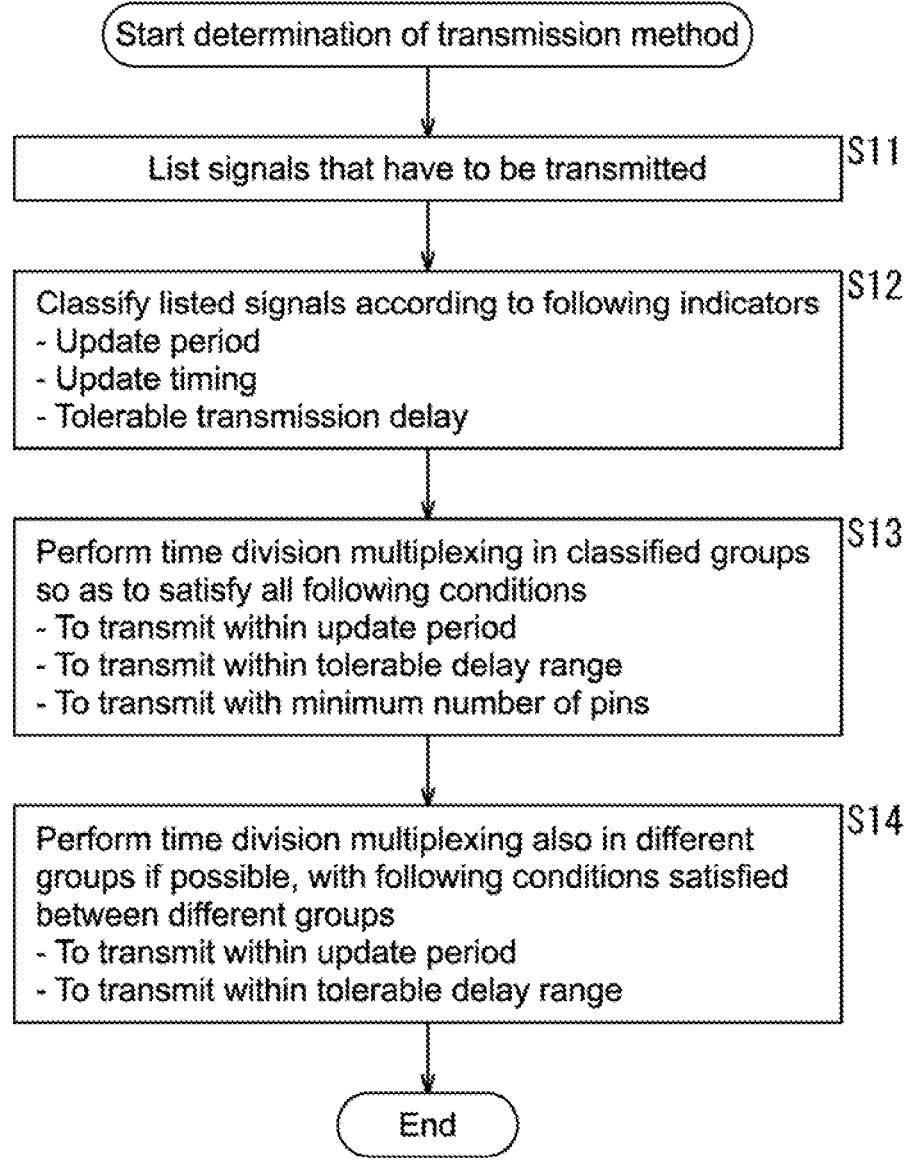
FIG. 2 A flowchart for explaining the way of classifying signals to be transmitted.

In a system that requires to obtain the diversity gain by using the plurality of LSIs (two LSIs in this case), in order to suppress the numbers of pins for the reception and pins for the transmission, signals that have to be transmitted are transmitted by being time-multiplexed. FIG. 2 shows a determination procedure of the method of transmitting the signals that have to be transmitted.

For example, the determination procedure can be formed so as to be performed in a stage in which the reception unit is designed and so as to perform the transmission on the basis of the procedure at a time when the reception unit is manufactured. Further, when a power of the reception unit is turned on for the first time or each time the power is turned on, a process based on the determination procedure is performed, and the transmission method may be determined. Furthermore, the determined transmission method may be updated when necessary.

With reference to a flowchart shown in FIG. 2, in Step S11, first, signals that have to be transmitted are listed. The listed signals are classified on the basis of an update period, an update timing, and tolerable transmission delay in Step S12. It should be noted that in this case, the description is continued on the assumption that the signals are classified on the basis of the update period, the update timing, and the tolerable transmission delay. However, the signals can be classified depending on at least one characteristic out of the update period, the update timing, and the tolerable transmission delay.

In Step S13, in the group obtained by the classifications, a transmission method with time division multiplexing is determined. Here, by the transmission method with time division multiplexing, the transmission can be performed within the update period and within the range of the tolerable delay, and the determination is made so that the number of pins becomes minimum.

In Step S14, if it is possible to perform the time division multiplexing between different groups, a transmission method with the time division multiplexing between the groups is determined. At this time, as in Step S13, the classification is performed while determining whether the transmission can be performed within the update period and within the range of the tolerable delay.

By determining the transmission method according to this procedure, it is possible to minimize the number of pins within a range satisfying the required range. Hereinafter, the signal that has to be transmitted is referred to as transmission request data, and a transmission signal that has been subjected to the time division multiplexing is referred to as transmission data.

Figure 3:
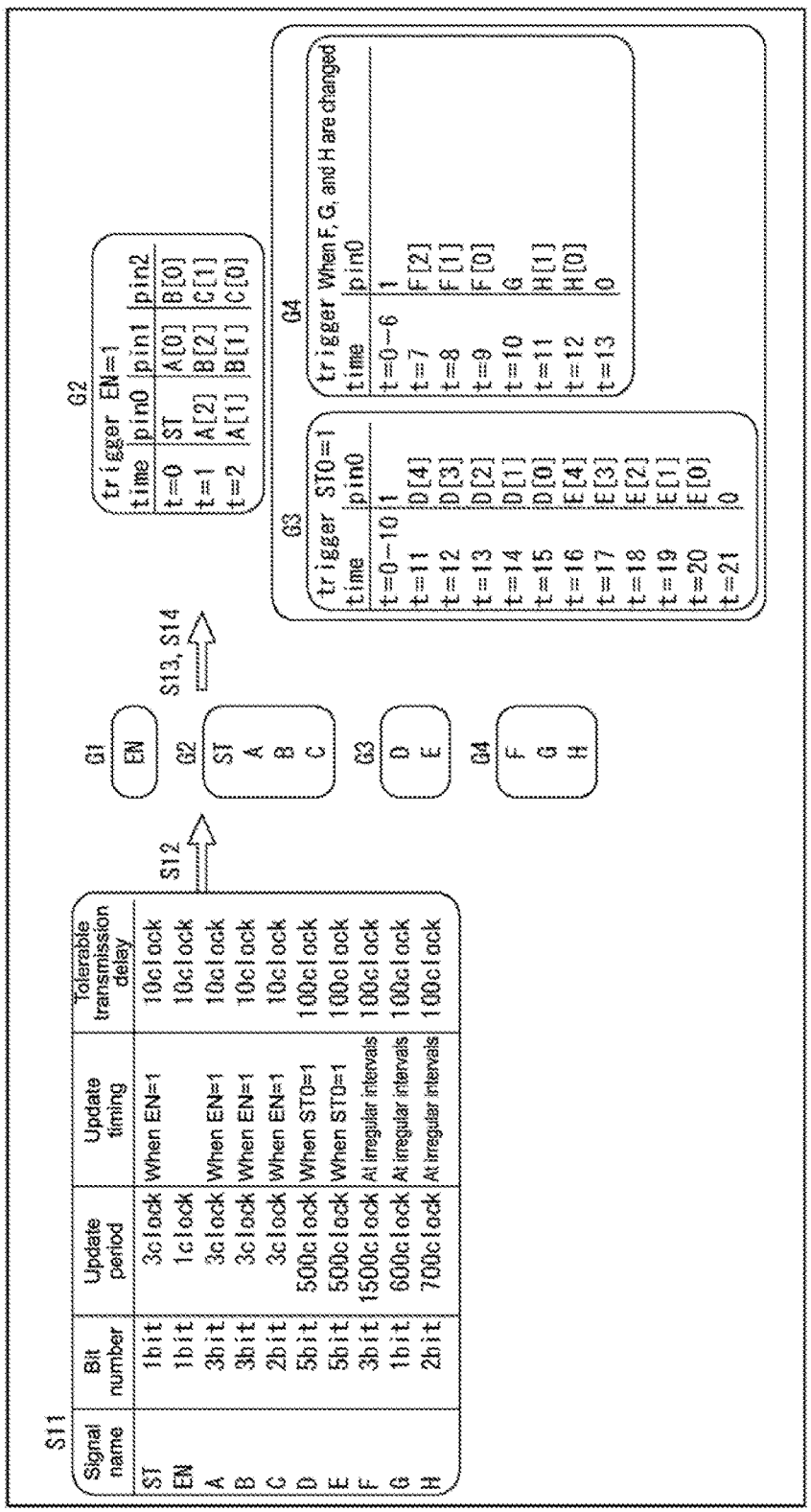
FIG. 3 A diagram showing a classification result.

Here, a specific example is cited to further describe the determination of the transmission method. FIG. 3 is a diagram showing an example of signals that have to be transmitted. In the example shown in FIG. 3, it is necessary to transmit signals of ST, EN, and A to H between the LSIs. The assumption is made that ST is a start flag, EN is enable, and A to H are predetermined signals.

The diagram on the left side in FIG. 3 shows an example of the list listed in Step S11. When referring to the list, the signal, the name of which is "ST" has the bit number of "1 bit", the update period thereof is "3 clocks", the update timing thereof is "when EN=1", and the tolerable transmission delay thereof is "10 clocks".

In a similar way, the signal, the name of which is "EN" has the bit number of "1 bit", the update period thereof is "1 clock", and the tolerable transmission delay thereof is "10 clocks". The signals, the names of which are "A" and "B" have the bit numbers of "3 bits", respectively, the update period thereof is "3 clocks", the update timing thereof is "when EN=1", and the tolerable transmission delay thereof is "10 clocks", respectively.

The signal, the name of which is "C" has the bit number of "2 bits", the update period thereof is "3 clocks", the update timing thereof is "when EN=1", and the tolerable transmission delay is "10 clocks". The signals, the names of which are "D" and "E" have the bit numbers of "5 bits", respectively, the update period thereof is "500 clocks", the update timing thereof is "when ST0=1", and the tolerable transmission delay thereof is "100 clocks", respectively.

The signal, the name of which is "F" has the bit number of "3 bits", the update period thereof is "1500 clocks", the update timing thereof is "at irregular intervals", and the tolerable transmission delay is "100 clocks". The signal, the name of which is "G" has the bit number of "1 bit", the update period thereof is "600 clocks", the update timing thereof is "at irregular intervals", and the tolerable transmission delay is "100 clocks". The signal, the name of which is "H" has the bit number of "2 bits", the update period thereof is "700 clocks", the update timing thereof is "at irregular intervals", and the tolerable transmission delay is "100 clocks".

In this way, the list in which the signal names, the bit numbers, the update periods, the update timings, and the tolerable transmission delays are associated is created.

The signals listed are classified on the basis of the update period, the update timing, the tolerable transmission delay in Step S12. In this case, the description is continued on the assumption that the signals are classified into four groups of G1 to G4, but even in the case where the signals are classified into groups other than four groups, the present technology can be applied thereto. Further, the classification may be performed on the assumption that four groups are generated in advance, or as a result of the classification, the four groups may be obtained.

The signals, the names of which are "ST", "A", "B", and "C" have commonalities in that the update period thereof is "3 clocks", the update timing thereof is "when EN=1", and the tolerable transmission delay thereof is "10 clocks", and therefore are classified into one group. In this case, the description is continued on the assumption that the signals are classified into a group G2.

Similarly, the signals, the names of which are "D" and "E" have commonalities in that the update period thereof is "500 clocks", the update timing thereof is "when ST0=1", and the tolerable transmission delay thereof is "100 clocks", and therefore classified into one group. In this case, the description is continued on the assumption that the signals are classified into a group G3.

Similarly, the signals, the names of which are "F", "G" and "H" have commonalities in that the update timing thereof is "at irregular intervals", and the tolerable transmission delay thereof is "100 clocks", although the update periods thereof are different from each other. Therefore, the signals are classified into one group. In this case, the description is continued on the assumption that the signals are classified into a group G4.

The remaining signal, the name of which "EN" is classified into a group G1. The classification result shows in the center part of FIG. 3.

Further, in Step S13, a time division multiplexing is taken into consideration in the group. The signal name "EN" that belongs to the group G1 has the update period of 1 clock and therefore cannot be multiplexed. The signals that belong to the group G2 have the update period of 3 clocks, and are changed in synchronization with EN=1, so it is determined that the 3 clocks are taken to perform transmission with the three pins with EN=1 as a trigger.

The signals that belong to the group G3 are changed in synchronization with ST0=1, so it is determined that the transmission is performed with one pine with ST0=1 as a trigger because of a long update period. For the signals that belong to the group G4, because of a large tolerable transmission delay and a long update period, it is determined that the transmission is performed with one pin with a timing when the states of the signal names "F", "G", and "H" are changed as a trigger, although the update is performed at irregular timings.

When the time division multiplexing in each of the groups as described above is determined, in Step S14, the time division multiplexing among the groups is taken into consideration. The signal that belongs to the group G1 is updated with 1 clock, and therefore cannot be subjected to the time division multiplexing with the signals that belong to other groups.

Further, the signals that belong to the group G2 are updated with the 3 clocks, but the signals that belong to the group G2 are subjected to the time division multiplexing, and cannot be subjected to the time division multiplexing with the signals in other groups. Therefore, the signals are not determined to be subjected the time division multiplexing with the signals in other groups.

The signals that belong to the group G3 and the signals that belong to group G4 have the long update period and the large tolerable transmission delay, and therefore the transmission thereof can be finished within the update period, even if the signals that belong to the group G3 and the signals that belong to the group G4 are subjected to the time division multiplexing.

Further, since the transmission can be performed within the tolerable transmission delay, the time division multiplexing is performed for the signals that belong to the group G3 and the signals that belong to the group G4 to transmit the group in which the trigger is caused. That is, in this case, the signals that belong to the group G3 and the signals that belong to the group G4 are determined as signals that are subjected to the time division multiplexing between the groups.

The signals that belong to the group G3 and the group G4 may be transmitted with the same pin, so the reception side has to discriminate between the signals that belong to the group G3 and the signals that belong to the group G4, and has to know start time points of the signals that belongs to the group G3 or G4. On the reception side, information for discriminating between the signals that belong to the group G3 and the signals that belong to the group G4, for example, such a rule is made that information of "0" is supplied at a time when the signals that belong to the group G3 are transmitted, and information of "1" is supplied at a time when the signals that belong to the group G4 are transmitted, and according to the rule, the discrimination can be performed.

After discrimination between the signals that belong to the group G3 and the signals that belong to the group G4 is performed on the reception side, in order to recognize the start of the signals, a start flag is transmitted from a transmission side. The start flag can be a flag for continuously transmitting "1" the number of times which cannot be achieved by a combination of the signals that belong to the group G3 and the signals that belong to the group G4.

For example, at times t=0 to 10 of the group G3, "1" is continuously transmitted. That is, when eleven pieces of "1" are continuously transmitted, this means a start flag that indicates the start of the transmission of the signals belonging to the group G3. The names of the signals that belong to the group G3 are "D" and "E", and the signals have 5 bits, respectively. If the signals, the names of which are "D" and "E" are continuously transmitted, and all the values thereof are "1", the signals have 10 bits in which ten pieces of "1" are continued, and are not therefore such signals that eleven pieces of "1" are continued.

Accordingly, as the start flag of the signals of the group G3, such a signal that eleven pieces of "1" are continuously transmitted is used, and thus on the reception side, it is possible to recognize that a signal main body is received from the 12th bit and start the process.

In a similar way, at times t=0 to 6 of the group G4, "1" is continuously transmitted. That is, when seven pieces of "1" are continuously transmitted, this means a start flag that indicates the start of the transmission of the signals belonging to the group G4.

In this way, on the reception side that has received the signals of seven pieces of or eleven pieces of "1" continuously transmitted, the fact can be recognized as the start flag that indicates the start of the transmission of the signals that belong to the group G3 or the group G4, and appropriate process can be performed.

Here, as the start flag, the example in which seven pieces of or eleven pieces "1" are continuously transmitted is cited in the above description, but is not limited to this example. It is only necessary to use signals which cannot be obtained in combination of the signals that belong to the group G3 and the signals that belong to the group G4.

Further, here, in the above description, the information that indicates whether the signals that belong to the group G3 or the signals that belong to the group G4 are transmitted is provided to the reception side. This kind of information may double as the start flag.

That is, for example, when the signals that belong to the group G3 are transmitted, twelve pieces of "1" are continuously transmitted, and when the signals that belong to the group G4 are transmitted, eleven pieces of "1" are continuously transmitted, and then one piece of "0" is transmitted. In this case, the continuous transmission of the eleven pieces of "1" can be attained by neither of the signals of the group G3 nor the signals of the group G4.

Therefore, in the case where "1" is continuously transmitted at t=0 to 10, this can be recognized as the start flag on the reception side. Further, in the case where "1" is transmitted at t=1, the reception side can recognize that the signals of the group G3 are transmitted. In the case where "0" is transmitted at t=11, the reception side can recognize that the signals of the group G4 are transmitted.

By using the signals as described above, it may be possible to discriminate the signals that belong to the group G3 and the signals that belong to the group G4 and recognize the start time point of the signal. It should be noted that the signals or the like given here are merely an example. A method for discriminating which of the groups the signals belong to, a method of recognizing the start time point of the signal, and the like are not limited to the examples given here, and other methods can be applied.

In this way, the signals that have to be transmitted are classified into the groups, with the result that it is possible to reduce the number of pins of the LSI. In this case, in order to transmit and receive the signals of the group G1, the signals of the group G2, and the signals of the group G3, one, three, and one pins are only necessary, respectively, so the transmission between the LSIs satisfying a transmission delay request can be performed with the five pins in total.

Figure 4:
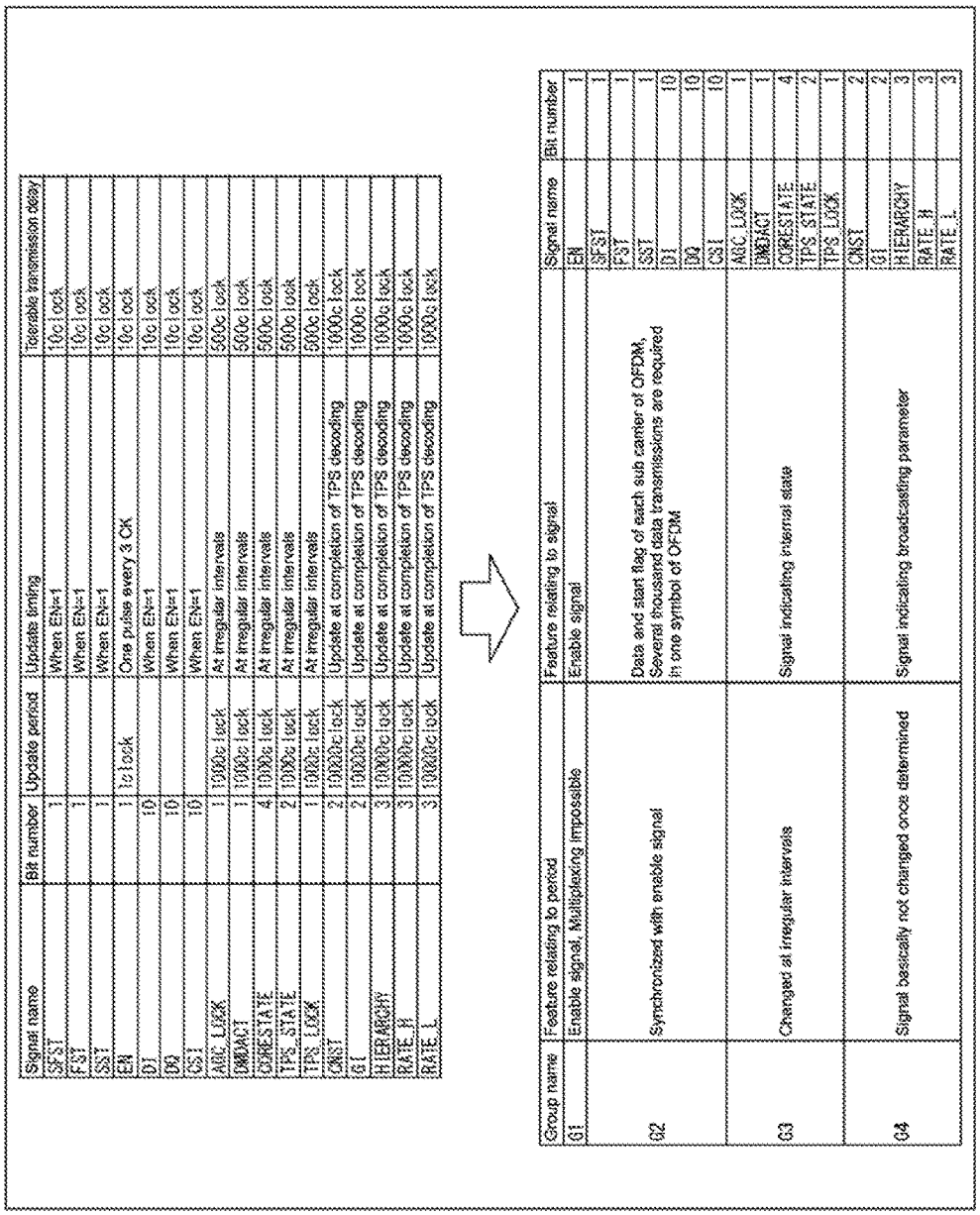
FIG. 4 A diagram showing a classification result.

FIG. 4 is a diagram showing a list of signals that have to be transmitted and a result of classification. In an upper part of FIG. 4, a specific example of the signals that have to be transmitted and a list thereof are shown, and in a lower part of FIG. 4, the result of the classification of the listed signals shown in the upper part is shown. Further, the signals shown in FIG. 4 are signals in DVB-T (Digital Video Broadcasting-Terrestrial) standard, for example.

Like the list shown in the left side of FIG. 3, the list shown in the upper part of FIG. 4 is a list in which the signal names, the bit numbers, the update periods, the update timings, and the tolerable transmission delays are associated with one another. For example, a signal, the name of which is "SFST" has the bit number of "1 bit", the update timing thereof is "when EN=1", and the tolerable transmission delay thereof is "10 clocks". The signal, the name of which is "SFST" is a signal that indicates a start position of a super frame.

A signal, the name of which is "FST" has the bit number of "1 bit", the update timing thereof is "when EN=1", the tolerable transmission delay thereof is "10 clocks". The signal, the name of which is "FST", is a signal that indicates a start position of a frame. A signal, the name of which is "SST" has the bit number of "1 bit", the update timing thereof is "when EN=1", and the tolerable transmission delay thereof is "10 clocks". The signal, the name of which is "SST" is a signal that indicates a start position of a transmission slot.

A signal, the name of which is "EN" has the bit number of "1 bit", the update period thereof is "1 clock", the update timing thereof is "one pulse every 3 clocks", and the tolerable transmission delay thereof is "10 clocks". The signal, the name of which is "EN" is an enable signal.

A signal, the name of which is "DI" has the bit number of "10 bits", the update timing thereof is "when EN=1", and the tolerable transmission delay thereof is "10 clocks". A signal, the name of which is "DQ" has the bit number of "10 bits", the update timing thereof is "when EN=1", and the tolerable transmission delay thereof is "10 clocks".

A signal, the name of which is "CSI" has the bit number of "10 bits", the update timing thereof is "when EN=1", and the tolerable transmission delay thereof is "10 clocks". The signal, the name of which is "CSI" is a signal that indicates channel state information.

A signal, the name of which is "AGC LOCK" has the bit number of "1 bit", the update period thereof is "1000 clocks", the update timing thereof is "at irregular intervals", and the tolerable transmission delay thereof is "500 clocks". A signal, the name of which is "DMDACT" has the bit number of "1 bit", the update period thereof is "1000 clocks", the update timing thereof is "at irregular intervals", and the tolerable transmission delay thereof is "500 clocks".

A signal, the name of which is "CORESTATE" has the bit number of "4 bits", the update period thereof is "1000 clocks", the update timing thereof is "at irregular intervals", and the tolerable transmission delay thereof is "500 clocks".

A signal, the name of which is "TPS STATE" has the bit number of "2 bits", the update period thereof is "1000 clocks", the update timing thereof is "at irregular intervals", and the tolerable transmission delay thereof is "500 clocks". A signal, the name of which is "TPS LOCK" has the bit number of "1 bit", the update period thereof is "1000 clocks", the update timing thereof is "at irregular intervals", and the tolerable transmission delay thereof is "500 clocks". The signals, the names of which are "TPS STATE" and "TPS LOCK", respectively, are signals relating to transmission parameters.

A signal, the name of which is "CNST" has the bit number of "2 bits", the update period thereof is "10000 clocks", the update timing thereof is "update at completion of TPS decoding", and the tolerable transmission delay thereof is "1000 clocks".

A signal, the name of which is "GI" has the bit number of "2 bits", the update period thereof is "10000 clocks", the update timing thereof is "update at completion of TPS decoding", and the tolerable transmission delay thereof is "1000 clocks". The signal, the name of which is "GI" is a signal relating to a guard interval. A signal, the name of which is "HIERARCHY" has the bit number of "3 bits", the update period thereof is "10000 clocks", the update timing thereof is "update at completion of TPS decoding", and the tolerable transmission delay thereof is "1000 clocks". The signal, the name of which is "HIERARCHY" is a signal relating to a hierarchy.

A signal, the name of which is "RATE H" has the bit number of "3 bits", the update period thereof is "10000 clocks", the update timing thereof is "update at completion of TPS decoding", and the tolerable transmission delay thereof is "1000 clocks". A signal, the name of which is "RATE L" has the bit number of "3 bits", the update period thereof is "10000 clocks", the update timing thereof is "update at completion of TPS decoding", and the tolerable transmission delay thereof is "1000 clocks". The signals, the name of which are "RATE H" and "RATE L", respectively, are signals relating to transmission rates.

Upon creation of the above-mentioned list of the signals that have to be transmitted, the signals are classified on the basis of the process of the flowchart shown in FIG. 2, thereby grouping the signals as shown in the lower part of FIG. 4. As in the case where the description is given with reference to FIG. 3, the case where the signals are classified into four groups will be shown.

Into a group, the name of which is "G1", the signal, the name of which "EN" is classified. The signal has a feature of "enable signal, multiplexing not possible" as a feature relating to the period, and has a feature of "enable signal" as a feature relating to the signal.

Into a group, the name of which is "G2", the signals, the name of which are "SFST", "FST", "SST", "DI", "DQ", and "CSI" are classified. The signals have a feature of "synchronizing with enable signal" as a feature relating to the period, and a feature of "data and start flag of each sub carrier of OFDM, several thousand data transmissions are necessary in one symbol of OFDM" as a feature relating to the signal.

Into a group, the name of which are "G3", the signals, the names of which are "AGC LOCK", "DMDACT", "CORESTATE", "TPS STATE", and "TPS LOCK" are classified. The signals have a feature of "changing at irregular intervals" as a feature relating to the period, and a feature of "signal indicating internal state" as a feature relating to the signal.

Into a group, the name of which is "G4", the signals, the name of which are "CNST", "GI", "HIERARCHY", "RATE H", and "RATE L" are classified. The signals have a feature of "signal basically not changed when determined once" as a feature relating to the period, and a feature of "signal indicating broadcasting parameter" as a feature relating to the signal.

In this case, although not shown in the figure, as in the case where the description is given with reference to FIG. 3, the signals that belong to the group G3 and the group G4 can be transmitted with one pin in a time-division manner. Further, a signal as described with reference to FIG. 3, such as a signal for discriminating between a signal that belongs to the group G3 and a signal that belongs to the group G4 and a signal that indicates a start time point of a signal (start flag), may be provided.

In this case, data can be transmitted and received between the LSIs with one pin for transmitting and receiving the signal of the group G1, four pins for transmitting and receiving the signals of the group G2, and one pin for transmitting and receiving the signals of the group G3 and the group G4, that is, six pins in total.

In this way, on the basis of the process of the flowchart shown in FIG. 2, the signals that have to be transmitted are classified, with the result that it is possible to suppress the number of pins of the LSI so as to correspond to the number of groups generated as a result of the classification.

That is, in a signal processing apparatus provided with a transmission unit configured to classify the obtained signals, for example, signals that have to be transmitted and received between processing units that obtains airwaves for processing as described above, and perform time division multiplexing for the signals in the group obtained by the classification and transmit the signals, it is possible to suppress the number of pins with which the signals are transmitted and received.

It should be noted that, herein, the description will be further given while citing the LSI as an example. However, the present technology can be applied to a signal processing unit configured to process an obtained signal, and an application range thereof is not limited to the LSI.

<Embodiment of Transmitting Clock and Transmission Data Together>

Next, assurance of a phase of a clock will be described. It is not assured that the phases of the clocks are the same among the plurality of LSIs, so it is necessary to perform appropriate process and reliably transmit signals that have to be transmitted. In view of this, the following case will be described as an example. In the case where the phases of the clocks are different among the plurality of LSIs, in order to reliably transmit the signals that have to be transmitted, the clock of an LSI on a transmission side of transmission data is transmitted to a reception side, thereby performing the transmission.

Figure 5:
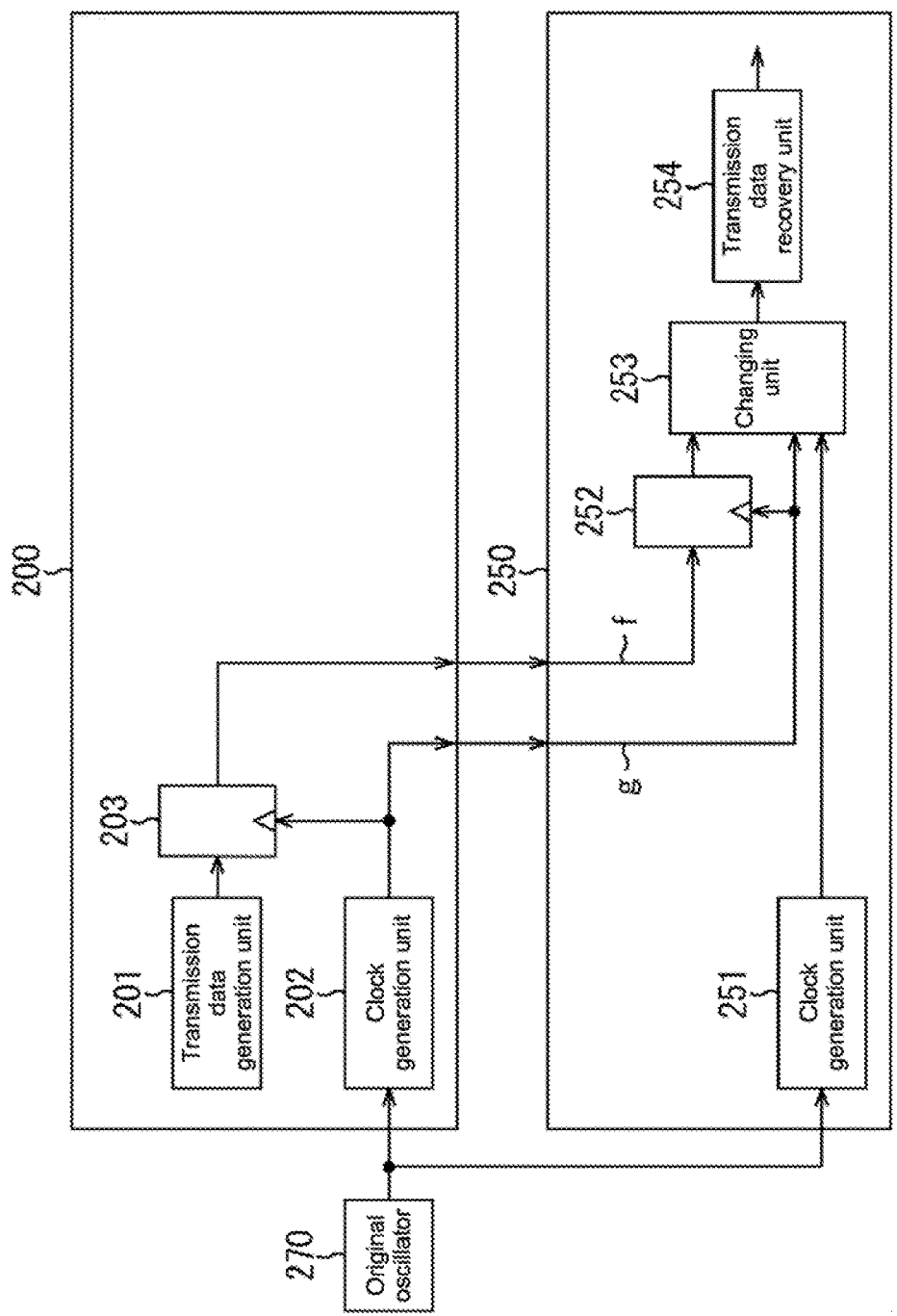
FIG. 5 A diagram showing the structure of the reception unit for transmitting data and a clock.

FIG. 5 is a diagram showing the structure of a reception unit in the case where a clock is transmitted with transmission data. The reception unit shown in FIG. 5 is simplified to describe the structure in the case where the clock and the transmission data are transmitted together. A structure applied to the reception unit shown in FIG. 1 will be described with reference to FIG. 9.

Further, with the structure as shown in FIG. 5, it is possible to transmit the clock and the transmission data together, and this kind of technique can be applied to a unit other than the reception unit to which diversity is applied. The example in which diversity is applied to the reception unit is merely an example.

With reference to FIG. 5, the reception unit is constituted of an LSI 200 and an LSI 250. The LSI 200 includes a transmission data generation unit 201, a clock generation unit 202, and a flip-flop 203. The LSI 250 is constituted of a clock generation unit 251, a flip-flop 252, a changing unit 253, and a transmission data restoration unit 254.

In the reception unit shown in FIG. 5, the LSI 200 is an LSI on the side where the transmission data is transmitted, and the LSI 250 is an LSI on the side where the transmission data is received. On the basis of oscillations of an original oscillator 270, the clock generation unit 202 of the LSI 200 generates a clock. In a similar way, on the basis of the oscillations of the original oscillator 270, the clock generation unit 251 of the LSI 250 generates a clock.

In this case, when a clock generated by the clock generation unit 202 of the LSI 200 is compared with a clock generated by the clock generation unit 251 of the LSI 250, the equality of the frequencies is assured, but synchronization of the phases is not assured.

The transmission data generation unit 201 performs time division multiplexing with respect to a signal that has to be transmitted from the LSI 200 to the LSI 250 and generates transmission data. For example, on the basis of classification of signals (data) that have to be transmitted, which is described above with reference to FIGS. 2 to 4, the data to be transmitted is subjected to time division multiplexing, thereby generating data to be transmitted to the LSI 250.

The transmission data generated by the transmission data generation unit 201 of the LSI 200 is synchronized, by the flip-flop 203, with a clock generated by clock generation unit 202. An output of the flip-flop 203 and the clock generated by the clock generation unit 202 are transmitted to the LSI 250.

By the LSI 250, a transmission data f from the flip-flop 203 and a clock g from the clock generation unit 202 are received. The received transmission data f and the clock g are supplied to the flip-flop 252 of the LSI 250.

In the flip-flop 252, the supplied transmission data f and clock g are synchronized. In the changing unit 253, clock changing is performed between the clock g and the clock generated by the clock generation unit 251, the frequencies of which are the same, but phases of which are not assured to be synchronized. That is, the changing unit 253 performs changing from a clock supplied from outside to a clock generated therein.

The transmission data restoration unit 254 of the LSI 250 recovers the transmission data f that is supplied from the changing unit 253 at a timing of a clock generated therein. The transmission data f is subjected to time division multiplexing, so demultiplexing is performed to take data out.

The structure shown in FIG. 5 can be applied to both of the case where a single-directional transmission is only performed with respect to one LSI to the other LSI and the case where a bidirectional transmission is performed between the LSIs.

<About Single-Directional Transmission of Clock>

Figure 6:
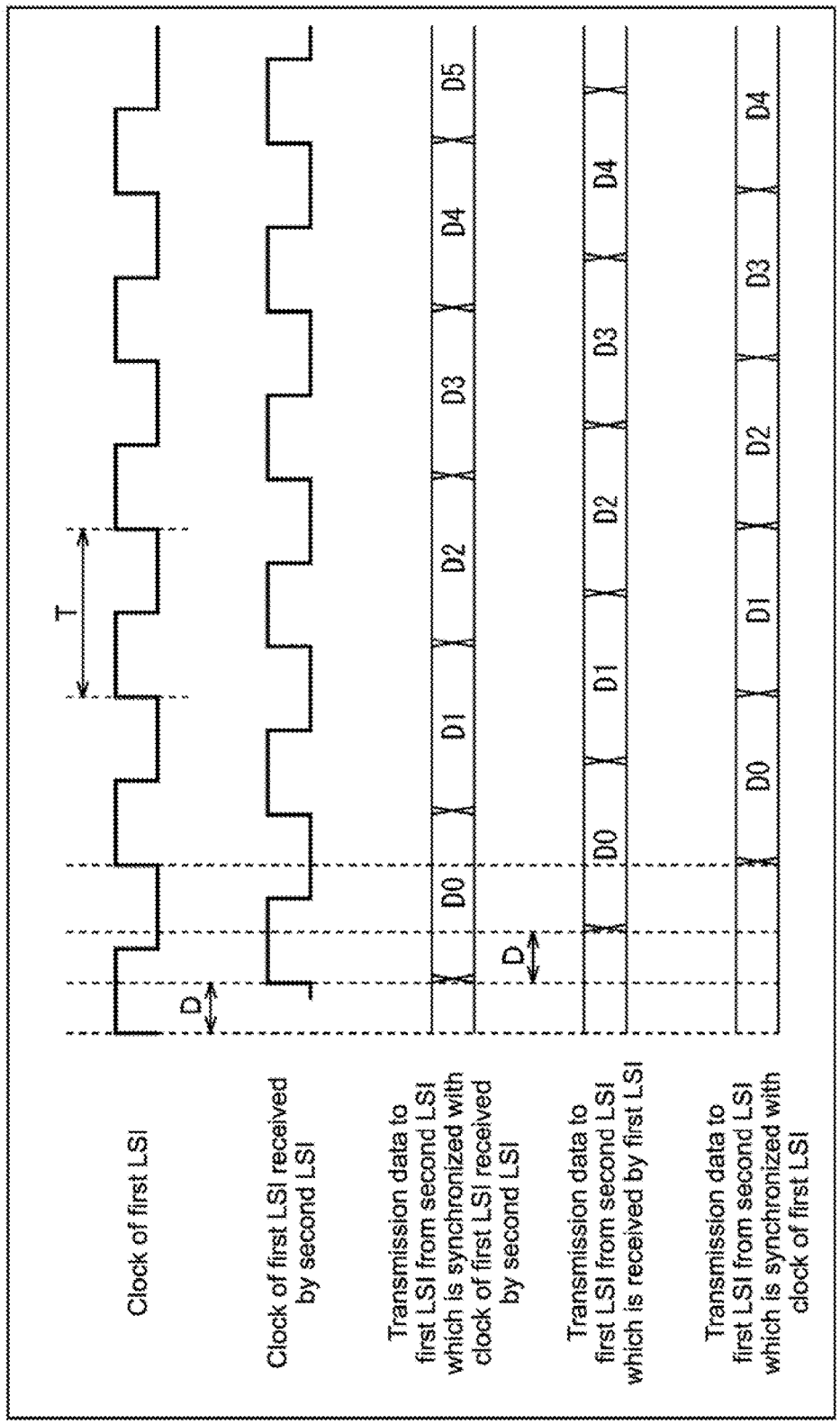
FIG. 6 A diagram for explaining conditions at a time when a clock is transmitted in a single direction.

Even in the relationship in which the equality of the frequencies is assured, but the synchronization of the phases is not assured, it is possible to transmit a clock only in a single direction, if a transmission delay between the LSIs satisfies certain conditions. With reference to FIG. 6, the conditions that allow the single-directional transmission of the clock are shown.

In a graph shown in FIG. 6, the uppermost stage indicates a clock of a first LSI, the second stage indicates a clock of the first LSI received by a second LSI, the third stage indicates transmission data from the second LSI to the first LSI which is synchronized with the clock of the first LSI received by the second LSI, the fourth stage indicates transmission data from the second LSI to the first LSI which is received by the first LSI, the fifth stage indicates transmission data from the second LSI to the first LSI which is synchronized with the clock with the first LSI.

The first LSI shown in FIG. 6 corresponds to the LSI 200 shown in FIG. 5, and the second LSI corresponds to the LSI 250, for example.

The assumption is made that the data transmission is performed between the first LSI and the second LSI bidirectionally, one cycle of the clock of the first LSI is set as T, and the transmission delay between the first LSI and the second LSI is set as D. At this time, as shown on the first stage and the second stage of FIG. 6, the clock of the first LSI which is received by the second LSI is a clock with a delay of D from the clock of the first LSI.

Further, as shown on the third stage of FIG. 6, when the reception clock is synchronized with data transmitted from the second LSI to the first LSI, this means a delay of D is generated from a leading edge of the clock of the first LSI.

When the data is transmitted from the second LSI to the first LSI, as shown on the fourth stage of FIG. 6, a delay of D is further generated. When the data is transmitted from the second LSI to the first LSI, a delay of D is further generated.

The transmission data received on the first LSI side is such a signal that the delay of 2D is generated from the leading edge of the clock of the first LSI. Therefore, as shown on the fifth stage of FIG. 6, in the case where the delay amount of 2D is smaller than the cycle of T, it is possible to take the transmission data transmitted from the second LSI at the leading edge of the next clock of the first LSI.

That is, if the one cycle of T of the clock of the first LSI is smaller than the double of the transmission delay D between the first LSI and the second LSI, the single-directional transmission of the clock can be performed. The structure of the reception unit in the case where the condition as described above is satisfied, and the single-directional transmission of the clock is performed is shown in FIG. 7.

Figure 7:
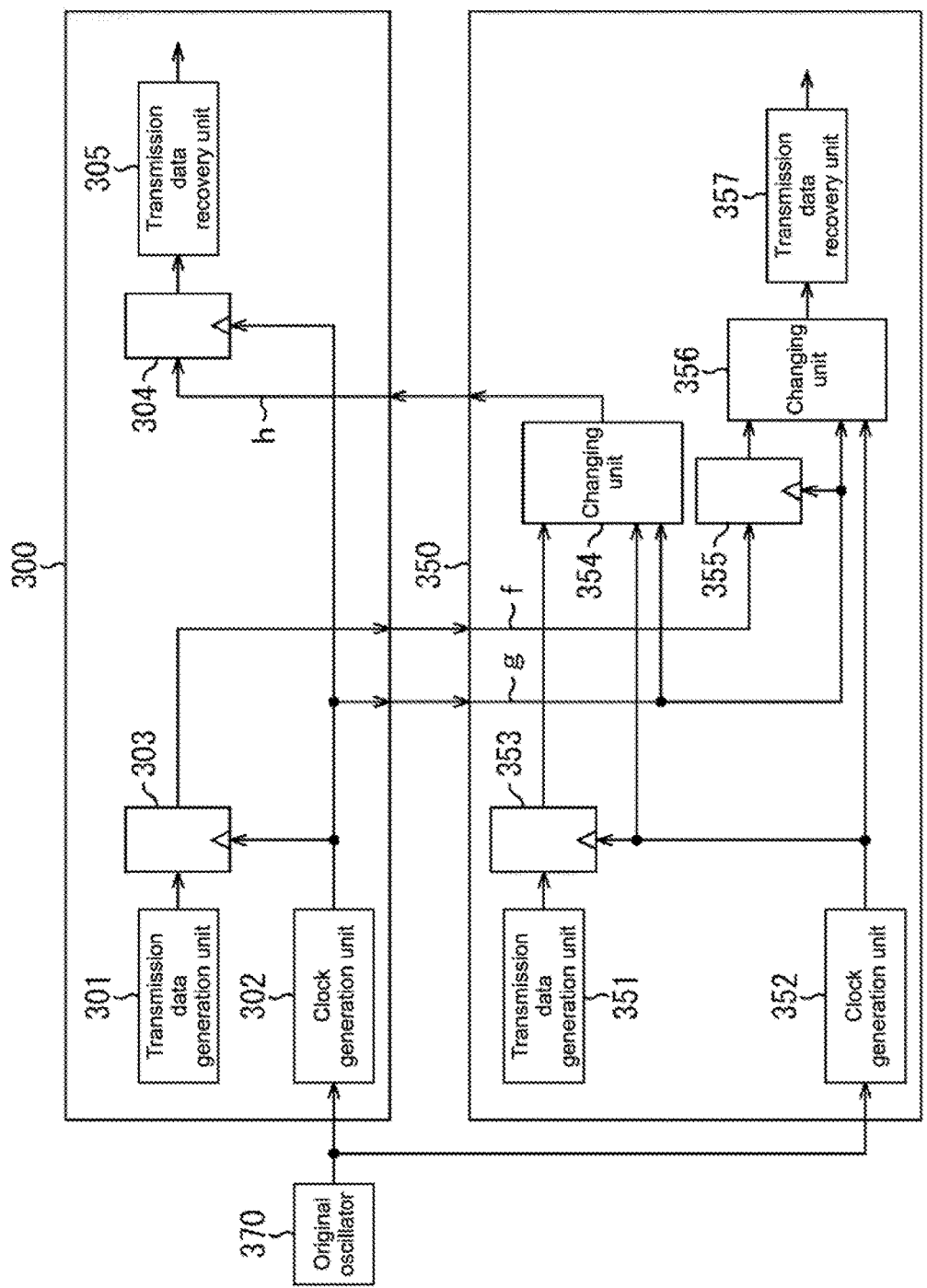
FIG. 7 A diagram showing the structure of the reception unit for transmitting a clock in a single direction.

FIG. 7 is a diagram showing the structure of the reception unit in the case where the clock is transmitted with the transmission data, and the clock is transmitted in the single direction. The reception unit shown in FIG. 7 is simplified for explanation about the structure in which the clock is transmitted with the transmission data. The structure in the case of application to the reception unit shown in FIG. 1 will be described with reference to FIG. 10.

The reception unit shown in FIG. 7 includes an LSI 300 and an LSI 350. The LSI 300 includes a transmission data generation unit 301, a clock generation unit 302, a flip-flop 303, a flip-flop 304, and a transmission data restoration unit 305.

The LSI 350 is provided with a transmission data generation unit 351, a clock generation unit 352, a flip-flop 353, a changing unit 354, a flip-flop 355, a changing unit 356, and a transmission data restoration unit 357.

For the reception unit shown in FIG. 7, the data transmission between the LSI 300 and the LSI 350 is performed bidirectionally, and the clock transmission is performed in a single direction from the LSI 300 to the LSI 350.

On the basis of oscillations of an original oscillator 370, the clock generation unit 302 of the LSI 300 generates a clock. In a similar way, on the basis of oscillations of the original oscillator 370, the clock generation unit 352 of the LSI 350 generates a clock. In this case, when the clock generated in the clock generation unit 302 of the LSI 300 is compared with the clock generated in the clock generation unit 352 of the LSI 350, the equality of the frequencies is assured, but the synchronization of the phases is not assured.

In the transmission data generation unit 301 of the LSI 300, a signal that has to be transmitted from the LSI 300 to the LSI 350 is subjected to time division multiplexing, and transmission data is generated. In performing time division multiplexing, the transmission data generation unit 301 performs time division multiplexing on the basis of the groups classified as described above. The generated transmission data is supplied to the flip-flop 303, and is synchronized with a clock generated in the clock generation unit 302. The transmission data that is synchronized in the flop-flop 303 with the clock generated in the clock generation unit 302 and the clock generated in the clock generation unit 302 are transmitted to the LSI 350.

In the LSI 350, the transmission data f and the clock g from the LSI 300 are received, and the flip-flop 355 synchronizes the transmission data f with the clock g. In the changing unit 356, clock changing is performed from the clock g to the clock generated by the clock generation unit 352. In the transmission data restoration unit 357, the transmission data is demultiplexed, to take the data out.

Further, in the transmission data generation unit 351 of the LSI 350, time division multiplexing is performed for a signal that has to be transmitted from the LSI 350 to the LSI 300, thereby generating the transmission data. The generated transmission data is supplied to the flip-flop 353, and is synchronized with the clock generated in the clock generation unit 352.

In the changing unit 354, clock changing is performed from the clock generated by the clock generation unit 352 to the clock g, and the data is transmitted to the LSI 300. The clock g is a clock generated by the clock generation unit 302 of the LSI 300 and transmitted from the LSI 300.

Thus, the transmission data transmitted from the LSI 350 to the LSI 300 is transmitted from the LSI 350 with the transmission data synchronized with the clock of the LSI 300, so clock changing between clocks, the phases of which are asynchronous, can be avoided, and therefore the number of transmission signals between the LSIs can be reduced.

The transmission data from the LSI 350 is supplied to the flip-plop 304, and is synchronized with the clock generated in the clock generation unit 302. In the transmission data restoration unit 305, the transmission data is demultiplexed to take the data out.

In this way, a configuration can be adopted in which the data is transmitted and received bidirectionally, but the clock is transmitted and received in the single direction between the plurality of LSIs.

It should be noted that, although not shown in the figure, a configuration can be adopted in which the data is transmitted and received bidirectionally, and the clock is also transmitted and received bidirectionally.

<About Use of Common Clock>

The clock generation unit is provided outside the LSI, with the result that the phase synchronization and the frequency synchronization between the two LSIs can be assured. In this case, when the transmission delay between the LSIs is assured to be smaller than the update period of the transmission data, it is possible to take out the data on the reception side. The reception unit having such a structure is shown in FIG. 8.

Figure 8:
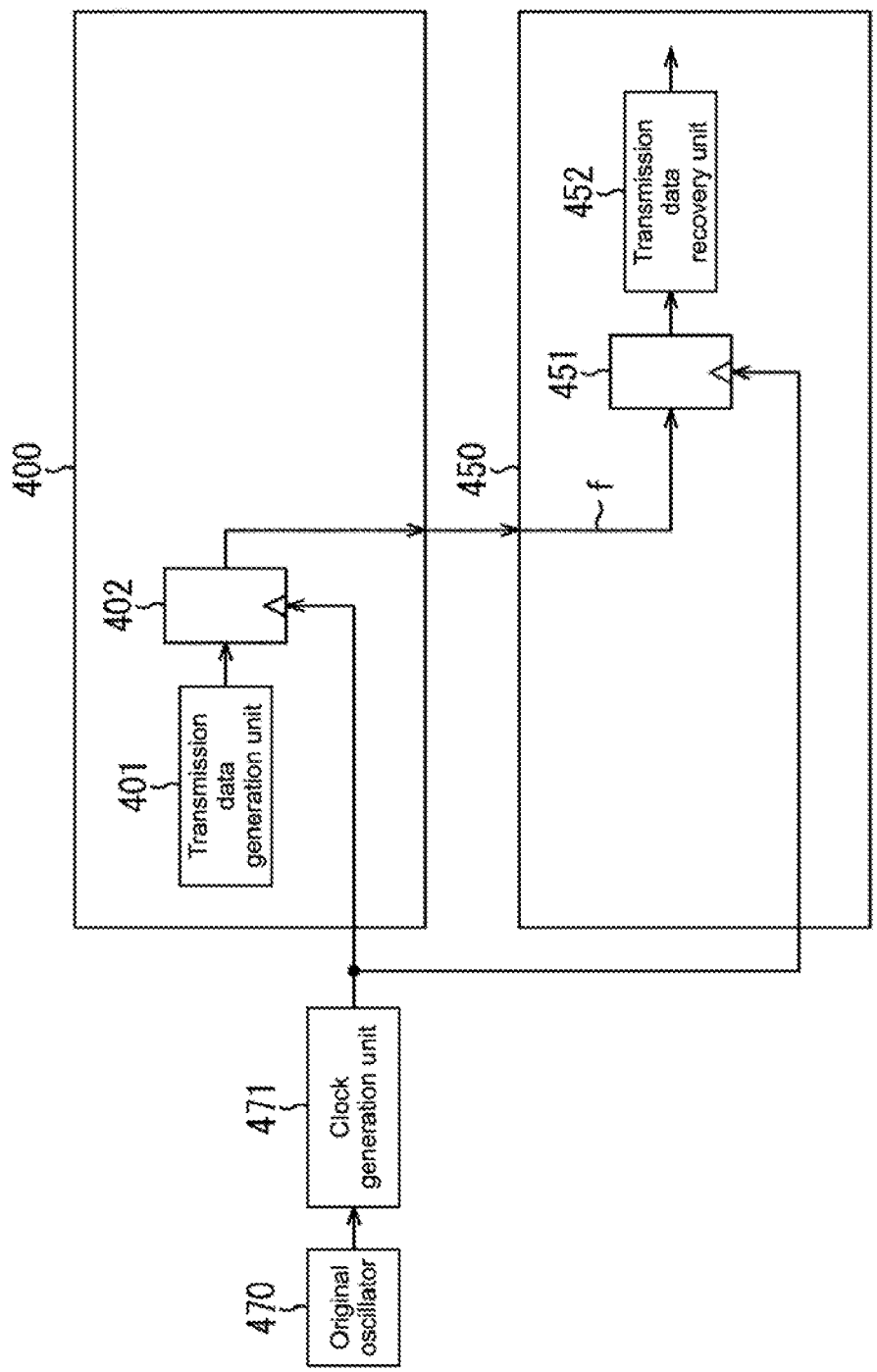
FIG. 8 A diagram showing the structure of the reception unit using a common clock.

The reception unit shown in FIG. 8 is provided with an LSI 400 and an LSI 450, and further provided with a clock generation unit 471 in addition to these LSIs. The LSI 400 is an LSI for transmitting transmission data, and the LSI 450 is an LSI for receiving the transmission data. The LSI 400 is provided with a transmission data generation unit 401 and a flip-flop 402, and the LSI 450 includes a flip-flop 451 and a transmission data restoration unit 452.

On the basis of oscillations of an original oscillator 470, the clock generation unit 471 generates a clock. The clock generated by the clock generation unit 471 is supplied to the flip-flop 402 of the LSI 400 and the flip-flop 451 of the LSI 450.

That is, in this case, the clock generated by the clock generation unit 471 is shared by the LSI 400 and the LSI 450. At this time, the frequency synchronization and the phase synchronization of the clocks of the LSI 400 and the LSI 450 are assured.

The transmission data generation unit 401 of the LSI 400 performs time division multiplexing for a signal that has to be transmitted from the LSI 400 to the LSI 450, and generates transmission data. The transmission data generated by the transmission data generation unit 401 is supplied to the flip-flop 402, synchronized with the clock generated by the clock generation unit 471, and transmitted to the LSI 450.

The flip-flop 451 of the LSI 450 received the transmission data f from the LSI 400. The flip-flop 451 causes the transmission data f to be synchronized with the clock generated by the clock generation unit 471, and supplies the data to the transmission data restoration unit 452. The transmission data restoration unit 452 demultiplexes the transmission data f, to take the data out.

As described above, by providing the clock generation unit for generating the clock in the outside of the LSIs that perform data transmission and reception, it is possible to assure both of the frequency synchronization and the phase synchronization at a time when the data transmission and reception are performed.

<Reception Unit for Bidirectional Clock Transmission>

Figure 9:
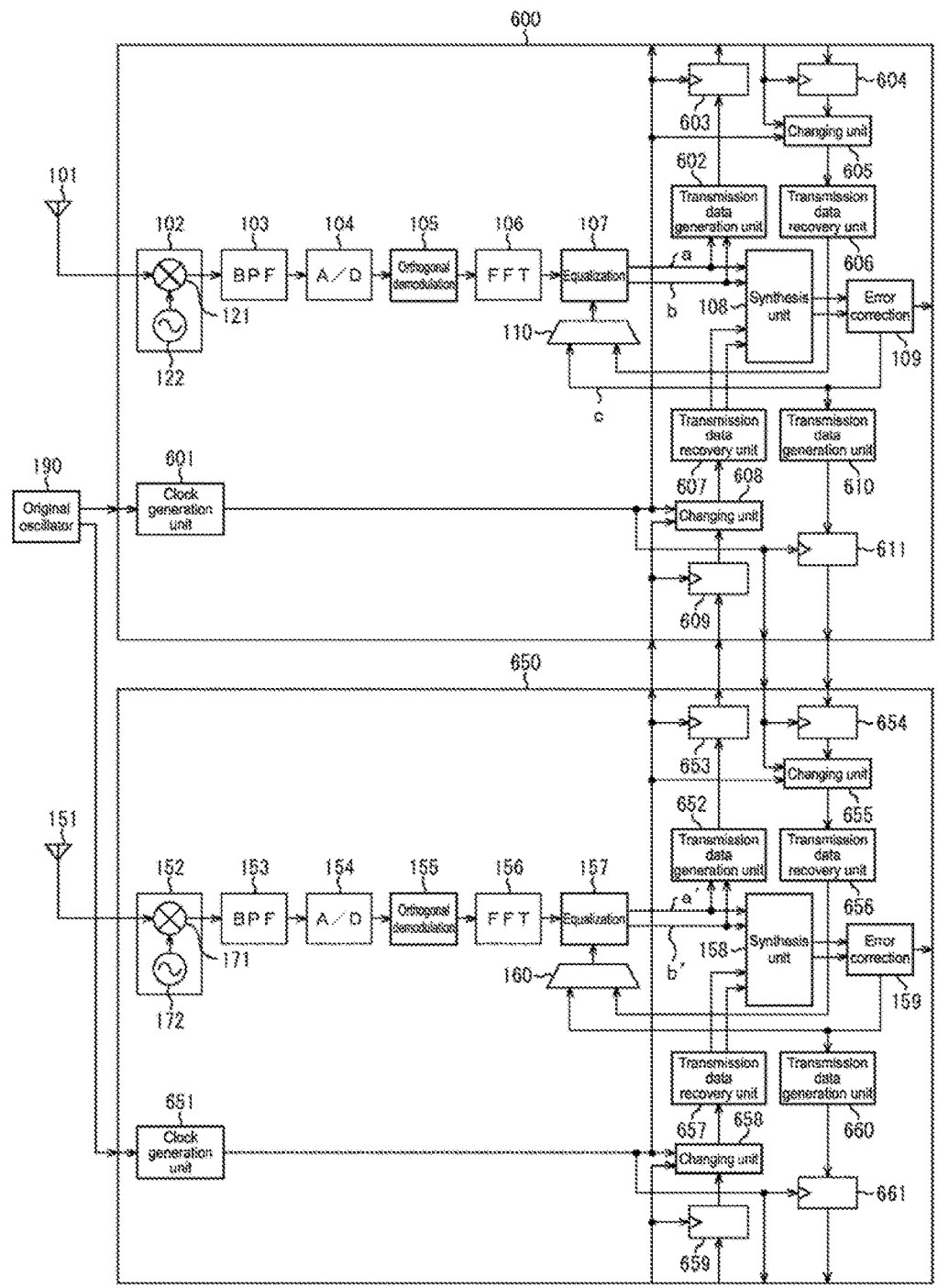
FIG. 9 A diagram showing the structure of the reception unit for transmitting data and a clock.

FIG. 9 shows the structure of the reception unit in the case where the reception unit using the bidirectional clock transmission shown in FIG. 5 is applied to the reception unit shown in FIG. 1.

The reception unit shown in FIG. 9 has the same parts as the reception unit shown in FIG. 1, the same parts are denoted by the same reference numerals, and the description thereof will be omitted for convenience. The reception unit shown in FIG. 9 is provided with an LSI 600 and an LSI 650.

Like the LSI 100 shown in FIG. 1, the LSI 600 is provided with the tuner 102, the BPF 103, the A/D conversion unit 104, the orthogonal demodulation unit 105, the FFT computation unit 106, the equalization unit 107, the synthesis unit 108, the error correction unit 109, and the selector 110. Further, the tuner 102 is provided with the multiplication unit 121 and the local oscillation unit 122.

The LSI 600 further includes a clock generation unit 601, a transmission data generation unit 602, a flip-flop 603, a flip-flop 604, a changing unit 605, a transmission data restoration unit 606, a transmission data restoration unit 607, a changing unit 608, a flip-flop 609, a transmission data generation unit 610, and a flip-flop 611.

In a similar way, like the LSI 150 shown in FIG. 1, the LSI 650 is provided with, the tuner 152, the BPF 153, the A/D conversion unit 154, the orthogonal demodulation unit 155, the FFT computation unit 156, the equalization unit 157, the synthesis unit 158, the error correction unit 159, and the selector 115. Further, the tuner 152 is constituted of the multiplication unit 171 and the local oscillation unit 172.

The LSI 650 further includes a clock generation unit 651, a transmission data generation unit 652, a flip-flop 653, a flip-flop 654, a changing unit 655, a transmission data restoration unit 656, a transmission data restoration unit 657, a changing unit 658, a flip-flop 659, a transmission data generation unit 660, and a flip-flop 661.

The LSI 600 and the LSI 650 include the structures as described above. That is, the LSI 600 and the LSI 650 are the LSIs having the same structure. Even if the LSI 600 or the LSI 650 is used alone, a signal received via the antenna can be processed as the reception unit. Further, as shown in FIG. 9, by using the plurality of LSIs, those can be applied to a system such as diversity.

That is, in this case, the LSI 600 (LSI 650) can be used alone or in combination, and therefore has high versatility. The high versatility makes it possible to reduce manufacturing cost or the like.

The LSI 600 is an LSI that operates in a main mode and operates on the basis of the clock generated by the clock generation unit 601 on the basis of oscillations of the original oscillator 190. The LSI 650 is an LSI that operates in a sub mode and operates on the basis of the clock generated by the clock generation unit 651 on the basis of oscillations of the original oscillator 190.

Airwaves transmitted from a broadcasting station is received via the antenna 101 and is supplied, as an RF signal, to the tuner 102. The tuner 102 is constituted of the multiplication unit 121 and the local oscillation unit 122, and performs frequency conversion for the RF signal received via the antenna 101 to the IF signal. The IF signal obtained by the tuner 102 is filtered by the band pass filter 103, then digitized by the A/D conversion unit 104, and supplied to the orthogonal demodulation unit 105.

The orthogonal demodulation unit 105 performs orthogonal demodulation for the digitized IF signal and outputs an OFDM time domain signal. The OFDM time domain signal is supplied to the FFT computation unit 106. The FFT computation unit 106 performs FFT computation with respect to the OFDM time domain signal and outputs OFDM frequency domain signal.

The OFDM frequency domain signal is supplied to the equalization unit 107. The equalization unit 107 calculates transmission channel characteristics for all sub carriers, thereby compensating for distortion of the OFDM frequency domain signal due to the transmission channel and obtaining the equalization signal a of the first system. At this time, the equalization unit 107 also outputs the reliability information b of the first system of each equalization signal. The equalization signal a and the reliability information b are output to the synthesis unit 108.

In a similar way, the airwaves transmitted from the broadcasting station are also received via the antenna 151 and supplied, as an RF signal, to the tuner 152. The tuner 152 is constituted of the multiplication unit 171 and the local oscillation unit 172, and performs the frequency conversion for the RF signal received via the antenna 151 into an IF signal. The IF signal obtained by the tuner 152 is filtered by the band pass filter 153, then digitized by the A/D conversion unit 154, and supplied to the orthogonal demodulation unit 155.

The orthogonal demodulation unit 155 performs orthogonal demodulation for the digitized IF signal and outputs an OFDM time domain signal. The OFDM time domain signal is supplied to the FFT computation unit 156. The FFT computation unit 156 performs FFT computation with respect to the OFDM time domain signal, and extracts and outputs data that has been subjected to orthogonal modulation to the sub carriers.

The FFT computation unit 156 performs FFT computation with respect to the OFDM time domain signal, and outputs the OFDM frequency domain signal. The OFDM frequency domain signal is supplied to the equalization unit 157. The equalization unit 157 calculates transmission channel characteristics for all the sub carriers, thereby compensating for distortion of the OFDM frequency domain signal due to the transmission channel and obtaining the equalization signal a' of the second system. At this time, the equalization unit 157 also outputs the reliability information b' of the second system of each equalization signal at the same time.

The equalization signal a' of the second system and the reliability information b' of the second system are transmitted to the LSI 600 that operates in the main mode. At a time when the equalization signal a' of the second system and the reliability information b' of the second system are transmitted to the LSI 600, first, the equalization signal a' of the second system and the reliability information b' of the second system are subjected to time division multiplexing by the transmission data generation unit 652. The time division multiplexing is performed on the basis of the classification of the signals described with reference to FIG. 2.

The equalization signal a' of the second system and the reliability information b' of the second system (hereinafter, referred to as transmission data) that have been subjected to time division multiplexing are supplied to the flip-flop 653.

To the flip-flop 653, the clock generated by the clock generation unit 651 is also supplied. The flip-flop 653 causes the supplied transmission data to be synchronized with the supplied clock, and transmits the data to the LSI 600.

To the LSI 600, the clock generated by the clock generation unit 651 of the LSI 650 is also supplied. The clock generated by the clock generation unit 651 is supplied to the flip-flop 609 and the changing unit 608 of the LSI 600.

The flip-flop 609 of the LSI 600 synchronizes the transmitted transmission data with the clock from the LSI 650. The synchronized transmission data is supplied to the changing unit 608. To the changing unit 608, the clock generated by the clock generation unit 601 in the LSI 600 is also supplied.

The changing unit 608 changes the clocks from the clock from the LSI 650 to the clock generated in the LSI 600. The transmission data that has been subjected to the clock changing is supplied to the transmission data restoration unit 607. The data supplied to the transmission data restoration unit 607 is data that has been subjected to the time division multiplexing and data synchronized with the clock generated in the LSI 600.

The transmission data restoration unit 607 performs demultiplexing the signal that has been subjected to time division multiplexing, and takes out and supplies the equalization signal a' of the second system and the reliability information b' of the second system to the synthesis unit 108. The synthesis unit 108 performs synthesis or selection for the equalization signal a of the first system and the equalization signal a' of the second system on the basis of the reliability information b of the first system and the reliability information b' of the second system, and outputs the equalization signal the quality of which is improved and the reliability information on which the diversity gain is reflected to the error correction unit 109.

The error correction unit 109 performs Viterbi decoding, diffusion signal removal, and RS decoding, and outputs the decoded data. The feedback signal c output from the error correction unit 109 is input to the equalization unit 107 through the selector 110.

On the other hand, the feedback signal c is also transmitted to the LSI 650 that operates in the sub mode. The feedback signal c is transmitted to the transmission data generation unit 610, subjected to time division multiplexing, and supplied to the flip-flop 611. To the flip-flop 611, the clock generated by the clock generation unit 601 is supplied, and the feedback signal c that has been subjected to the time division multiplexing is synchronized with the clock and transmitted to the LSI 650.

To the flip-flop 654 of the LSI 650, the feedback signal c that has been subjected to time division multiplexing and the clock generated in the clock generation unit 601 are supplied. The flip-flop 654 causes the supplied clock to be synchronized with the supplied feedback signal c that has been subjected to time division multiplexing, and outputs the clock to the changing unit 655.

To the changing unit 658, the clock generated by the clock generation unit 651 in the LSI 650 is also supplied. The changing unit 658 changes clocks from the clock from the LSI 600 to the clock generated in the LSI 650. The clock-changed feedback signal c that has been subjected to time division multiplexing is supplied to the transmission data restoration unit 656.

The transmission data restoration unit 656 performs demultiplexing for the signal that has been subjected to time division multiplexing, and takes out and supplies the feedback signal c to the selector 160.

In this way, the data transmission and reception are performed between the LSI 600 and the LSI 650.

The above structure can be applied to both of the case where only the single-directional transmission from one LSI to the other LSI is performed and the case where the bidirectional transmission is performed between the two LSIs.

<Reception Unit for Single-Directional Clock Transmission>

Figure 10:
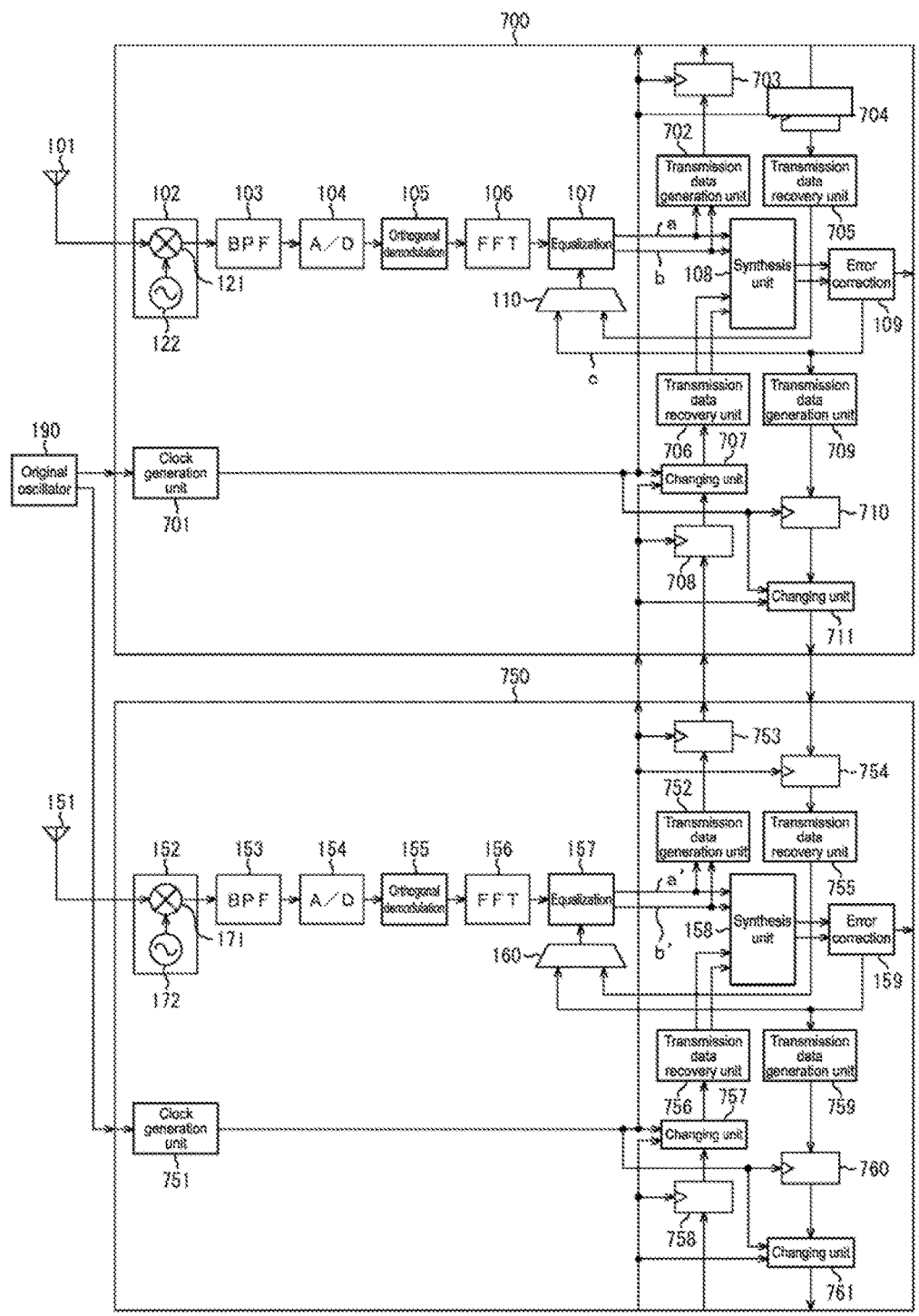
FIG. 10 A diagram showing the structure of the reception unit for transmitting a clock in a single direction.

FIG. 10 shows the structure of the reception unit in the case where the reception unit using the single-directional clock transmission shown in FIG. 7 is applied to the reception unit shown in FIG. 1.

The reception unit shown in FIG. 10 has the same parts as the reception unit shown in FIG. 1. The same parts are denoted by the same reference numerals, and the description thereof will be omitted for convenience. The reception unit shown in FIG. 10 is provided with an LSI 700 and an LSI 750.

Like the LSI 100 shown in FIG. 1, the LSI 700 is provided with the tuner 102, the BPF 103, the A/D conversion unit 104, the orthogonal demodulation unit 105, the FFT computation unit 106, the equalization unit 107, the synthesis unit 108, the error correction unit 109, and the selector 110. Further, the tuner 102 is constituted of the multiplication unit 121 and the local oscillation unit 122.

The LSI 700 further includes a clock generation unit 701, a transmission data generation unit 702, a flip-flop 703, a flip-flop 704, a transmission data restoration unit 705, a transmission data restoration unit 706, a changing unit 707, a flip-flop 708, a transmission data generation unit 709, a flip-flop 710, and a changing unit 711.

In a similar way, like the LSI 150 shown in FIG. 1, the LSI 750 is provided with the tuner 152, the BPF 153, the A/D conversion unit 154, the orthogonal demodulation unit 155, the FFT computation unit 156, the equalization unit 157, the synthesis unit 158, the error correction unit 159, and the selector 115. Further, the tuner 152 is provided with the multiplication unit 171 and the local oscillation unit 172.

The LSI 750 further includes a clock generation unit 751, a transmission data generation unit 752, a flip-flop 753, a flip-flop 754, a transmission data restoration unit 755, a transmission data restoration unit 756, a changing unit 757, a flip-flop 758, a transmission data generation unit 759, a flip-flop 760, and a changing unit 761.

The LSI 700 and the LSI 750 have the structures as described above. That is, the LSI 700 and the LSI 750 are the LSIs having the same structure. Even if the LSI 700 or the LSI 750 is used alone, a signal received via the antenna can be processed as the reception unit. Further, as shown in FIG. 10, by using the plurality of LSIs, those can be applied to a system such as diversity.

That is, in this case, the LSI 700 (LSI 750) can be used alone or in combination, and therefore has high versatility. The high versatility makes it possible to reduce manufacturing cost or the like.

The LSI 700 is an LSI that operates in a main mode and operates on the basis of the clock generated by the clock generation unit 701 on the basis of oscillations of the original oscillator 190. The LSI 750 is an LSI that operates in a sub mode and operates on the basis of the clock generated by the clock generation unit 751 on the basis of oscillations of the original oscillator 190.

The processes or the like with respect to the signals received via the antenna 101 or the antenna 151 are the same in the case described with reference to FIG. 1, so the description thereof will be omitted here. A process at a time when the signal is supplied from the LSI 700 to the LSI 750 or a process at a time when the signal is supplied from the LSI 750 to the LSI 700 will be additionally described.

The FFT computation unit 156 performs FFT computation with respect to the OFDM time domain signal, and supplies the OFDM frequency domain signal to the equalization unit 157. The equalization unit 157 calculates transmission channel characteristics for all the sub carriers, thereby compensating for distortion of the OFDM frequency domain signal due to the transmission channel and obtaining the equalization signal a' of the second system. At this time, the equalization unit 157 also outputs the reliability information b' of the second system of each equalization signal at the same time.

The equalization signal a' of the second system and the reliability information b' of the second system are transmitted to the LSI 700 that operates in the main mode. When the equalization signal a' of the second system and the reliability information b' of the second system are transmitted to the LSI 700, first, the equalization signal a' of the second system and the reliability information b' of the second system are subjected to time division multiplexing by the transmission data generation unit 752.

The equalization signal a' of the second system and the reliability information b' of the second system (hereinafter, referred to as transmission data) that have been subjected to time division multiplexing are supplied to the flip-flop 753. To the flip-flop 753, the clock generated by the clock generation unit 751 is also supplied. The flip-flop 753 causes the supplied transmission data to be synchronized with the supplied clock and transmits the data to the LSI 700.

To the LSI 700, the clock generated by the clock generation unit 751 of the LSI 750 is also supplied. The clock generated by the clock generation unit 751 is supplied to the flip-flop 708 and the changing unit 707 of the LSI 700.

The flip-flop 708 of the LSI 700 synchronizes the transmitted transmission data with the clock from the LSI 750. The synchronized transmission data is supplied to the changing unit 707. To the changing unit 707, the clock generated by the clock generation unit 701 in the LSI 700 is also supplied.

The changing unit 707 changes clocks from the clock from the LSI 750 to the clock generated in the LSI 700. The transmission data that has been subjected to clock changing is supplied to the transmission data restoration unit 706. The data supplied to the transmission data restoration unit 706 is data that has been subjected to time division multiplexing and data synchronized with the clock generated in the LSI 700.

The transmission data restoration unit 706 performs demultiplexing for the signal that has been subjected to time division multiplexing, takes out the equalization signal a' of the second system and the reliability information b' of the second system, and supplies those to the synthesis unit 108. The synthesis unit 108 performs synthesis or selection with respect to the equalization signal a of the first system and the equalization signal a' of the second system on the basis of the reliability information b of the first system and the reliability information b' of the second system, and outputs an equalization signal the quality of which is improved and reliability information on which the diversity gain is reflected to the error correction unit 109.

The error correction unit 109 performs Viterbi decoding, diffusion signal removal, and RS decoding and outputs decoded data. The feedback signal c output from the error correction unit 109 is input to the equalization unit 107 through the selector 110.

On the other hand, the feedback signal c is also transmitted to the LSI 750 that operates in the sub mode. The feedback signal c is supplied to the transmission data generation unit 709, subjected to time division multiplexing, and supplied to the flip-flop 710. To the flip-flop 710, the clock generated by the clock generation unit 701 is supplied, the feedback signal c that has been subjected to time division multiplexing is synchronized with the clock, and the signal is supplied to the changing unit 711.

To the changing unit 711, the clock generated by the clock generation unit 701 in the LSI 700 and the clock generated by the clock generation unit 751 in the LSI 750 are supplied. The changing unit 711 changes clocks from the clock generated by the clock generation unit 701 to the clock generated by the clock generation unit 751.

The clock-changed feedback signal c that has been subjected to time division multiplexing is transmitted to the LSI 750. In the LSI 750, the signal from the LSI 700 is received by the flip-flop 754. To the flip-flop 754, the clock generated by the clock generation unit 701 in the LSI 750 is also supplied.

The flip-flop 754 causes the supplied feedback signal c that has been subjected to time division multiplexing to be synchronized with the clock generated by the clock generation unit 751 and supplies the signal to the transmission data restoration unit 755. The transmission data restoration unit 755 performs demultiplexing for the signal that has been subjected to time division multiplexing, takes out the feedback signal c, and supplies the signal to the selector 160.

In this way, the data transmission and reception is performed between the LSI 700 and the LSI 750.

In the structure described above, a restriction is necessary for the transmission delay between the LSIs, but the clock transmission can be performed only in a single direction.

<Reception Unit for Common Clock>

Figure 11:
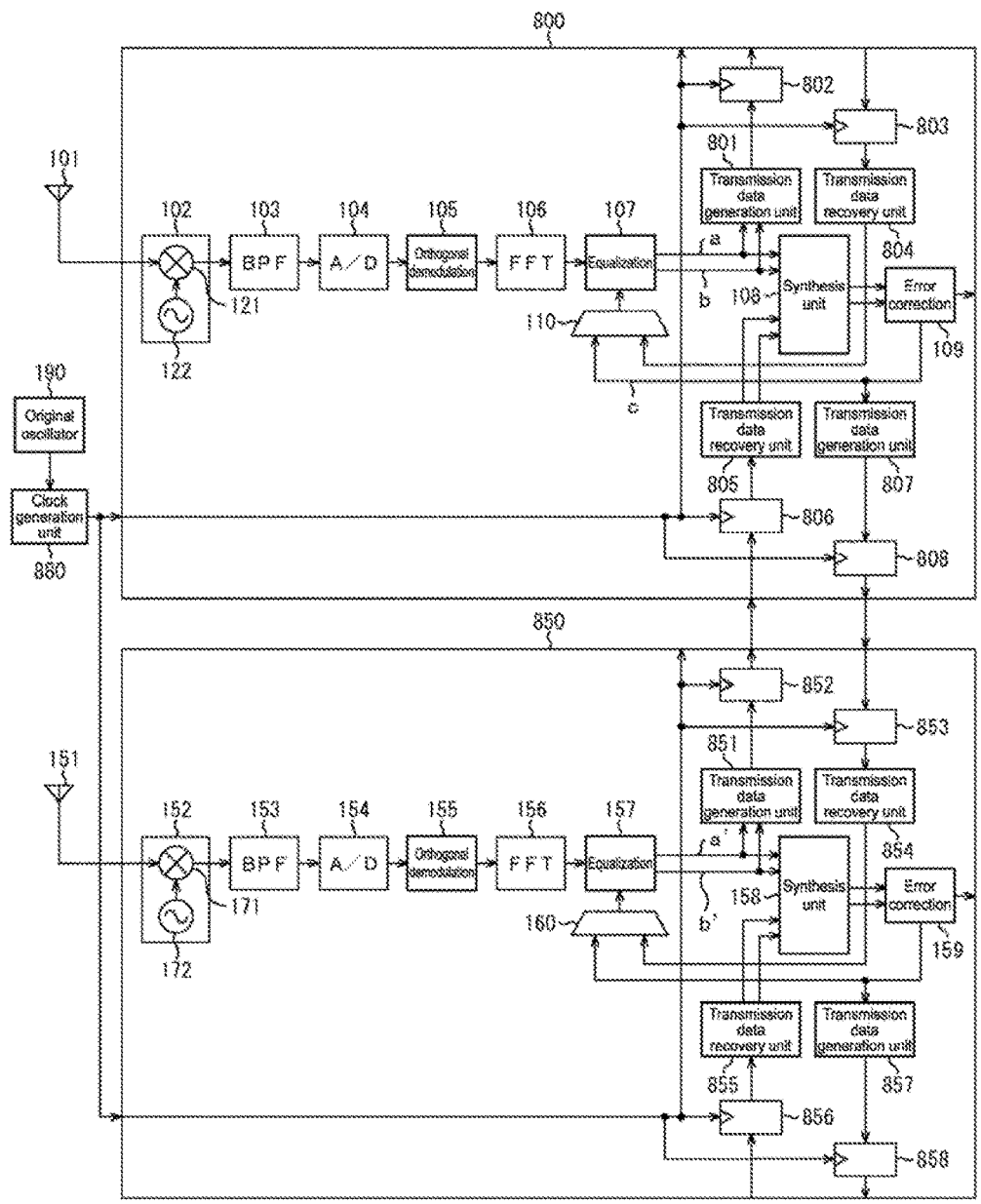
FIG. 11 A diagram showing the structure of the reception unit using a common clock.

FIG. 11 shows the structure of a reception unit in the case where the reception unit using the common clock shown in FIG. 8 is applied to the reception unit shown in FIG. 1.

The reception unit shown in FIG. 11 has the same parts as the reception unit shown in FIG. 1. The same parts are denoted by the same reference numerals, and the description thereof will be omitted for convenience. The reception unit shown in FIG. 11 is provided with an LSI 800 and an LSI 850.

Like the LSI 100 shown in FIG. 1, the LSI 800 is constituted of the tuner 102, the BPF 103, the A/D conversion unit 104, the orthogonal demodulation unit 105, the FFT computation unit 106, the equalization unit 107, the synthesis unit 108, the error correction unit 109, and the selector 110. Further, the tuner 102 is constituted of the multiplication unit 121 and the local oscillation unit 122.

The LSI 800 further includes a transmission data generation unit 801, a flip-flop 802, a flip-flop 803, a transmission data restoration unit 804, a transmission data restoration unit 805, a flip-flop 806, a transmission data generation unit 807, and a flip-flop 808.

In a similar way, like the LSI 150 shown in FIG. 1, the LSI 850 is provided with the tuner 152, the BPF 153, the A/D conversion unit 154, the orthogonal demodulation unit 155, the FFT computation unit 156, the equalization unit 157, the synthesis unit 158, the error correction unit 159, and the selector 115. Further, the tuner 152 is constituted of a multiplication unit 181 and the local oscillation unit 172.

The LSI 850 further includes a transmission data generation unit 851, a flip-flop 852, a flip-flop 853, a transmission data restoration unit 854, a transmission data restoration unit 855, a flip-flop 856, a transmission data generation unit 857, and a flip-flop 858.

The LSI 800 and the LSI 850 have the structures as described above. That is, the LSI 800 and the LSI 850 are the LSIs having the same structure. Even if the LSI 800 or the LSI 850 is used alone, a signal received via the antenna can be processed as the reception unit. Further, as shown in FIG. 11, by using the plurality of LSIs, those can be applied to a system such as diversity.

That is, in this case, the LSI 800 (LSI 850) can be used alone or in combination, and therefore has high versatility. The high versatility makes it possible to reduce manufacturing cost or the like.

The LSI 800 is an LSI that operates in a main mode. The LSI 850 is an LSI that operates in a sub mode. On the basis of oscillations of the original oscillator 190, the clock generated by a clock generation unit 880 disposed on the outside of the LSI 800 and the LSI 850 is distributed to both of the LSI 800 that operates in the main mode and the LSI 850 that operates in the sub model. At this time, the frequencies and the phases of the clocks supplied to the LSI 800 and the LSI 850 are in synchronized states.

The processes or the like with respect to the signals received via the antenna 101 or the antenna 151 are the same in the case described with reference to FIG. 1, so the description thereof will be omitted here. A process at a time when the signal is supplied from the LSI 800 to the LSI 850 or a process at a time when the signal is supplied from the LSI 850 to the LSI 800 will be additionally described.

The FFT computation unit 156 performs FFT computation with respect to the OFDM time domain signal, and supplies the OFDM frequency domain signal to the equalization unit 157. The equalization unit 157 calculates transmission channel characteristics for all the sub carriers, thereby compensating for distortion of the OFDM frequency domain signal due to the transmission channel and obtaining the equalization signal a' of the second system. At this time, the equalization unit 157 also outputs the reliability information b' of the second system of each equalization signal at the same time.

The equalization signal a' of the second system and the reliability information b' of the second system are transmitted to the LSI 800 that operates in the main mode. When the equalization signal a' of the second system and the reliability information b' of the second system are transmitted to the LSI 800, first, the equalization signal a' of the second system and the reliability information b' of the second system are subjected to time division multiplexing by the transmission data generation unit 851.

The equalization signal a' of the second system and the reliability information b' of the second system (hereinafter, referred to as transmission data) that have been subjected to time division multiplexing are supplied to the flip-flop 852. To the flip-flop 852, the clock generated by the clock generation unit 880 disposed on the outside of the LSI 850 is also supplied. The flip-flop 852 causes the supplied transmission data to be synchronized with the supplied clock and transmits the data to the LSI 800.

The LSI 800 receives, by the flip-flop 806, the transmission data from the LSI 850. To the flip-flop 806, the clock generated by the clock generation unit 880 is also supplied. The flip-flop 806 of the LSI 800 synchronizes the transmitted transmission data with the clock generated by the clock generation unit 880.

The synchronized transmission data is supplied to the transmission data restoration unit 805. The data supplied to the transmission data restoration unit 805 is data that has been subjected to time division multiplexing and data synchronized with the clock generated by the clock generation unit 880.

The transmission data restoration unit 805 performs demultiplexing for the signal that has been subjected to time division multiplexing, takes out the equalization signal a' of the second system and the reliability information b' of the second system, and supplies those to the synthesis unit 108. The synthesis unit 108 performs synthesis or selection for the equalization signal a of the first system and the equalization signal a' of the second system on the basis of the reliability information b of the first system and the reliability information b' of the second system, and outputs the equalization signal the quality of which is improved and the reliability information on which the diversity gain is reflected to the error correction unit 109.

The error correction unit 109 performs Viterbi decoding, diffusion signal removal, and RS decoding, to output decoded data. The feedback signal c output from the error correction unit 109 is input to the equalization unit 107 through the selector 110.

On the other hand, the feedback signal c is also transmitted to the LSI 850 that operates in the sub mode. The feedback signal c is supplied to the transmission data generation unit 807, subjected to time division multiplexing, and supplied to the flip-flop 808. To the flip-flop 808, the clock generated by the clock generation unit 880 is supplied, and the feedback signal c that has been subjected to time division multiplexing is synchronized with the clock. The signal is transmitted to the LSI 850.

In the LSI 850, the signal from the LSI 800 is received by the flip-flop 853. To the flip-flop 853, the clock generated by the clock generation unit 880 disposed on the outside of the LSI 850 is also supplied.

The flip-flop 853 causes the supplied feedback signal c that has been subjected to time division multiplexing to be synchronized with the clock generated by the clock generation unit 880 and supplies the signal to the transmission data restoration unit 854. The transmission data restoration unit 854 performs demultiplexing for the signal that has been subjected to time division multiplexing, takes out the feedback signal c, and supplies the signal to the selector 160.

In this way, the data transmission and reception is performed between the LSI 800 and the LSI 850.

In the structure described above, a restriction is necessary for the transmission delay between the LSIs, but the clock transmission is unnecessary, with the result that the number of pins used for the transmission between the LSIs can be further reduced.

As described above, by applying the present technology, even in the case where a great number of signals are necessary for the transmission between the LSIs in the system that requires to obtain the diversity gain by using the plurality of LSIs, the signals that have to be transmitted are classified on the basis of the characteristics thereof, and the signals that have been subjected to the time division multiplexing in the group obtained by the classifications are transmitted between the LSIs, thereby making it possible to reduce the number of pins used for the transmission between the LSIs while maintaining the function.

Further, even in the case where the equality of the clock phases between the multiple LSIs is not assured, by transmitting the clock in the single direction or in the bi-directions, it is possible to reliably transmit the signals that have to be transmitted.

Further, with the structure in which the original oscillator and the clock generation unit are disposed on the outside of the LSIs, the transmission of the clock is unnecessary, and thus it is possible to reliably transmit the signals that have to be transmitted.

<About Recording Medium>

The series of processes described above can be performed by hardware or software. In the case where the series of processes are performed by software, programs that configure the software are installed into a computer. Here, the computer includes a computer incorporated in dedicated hardware, for example, a general-purpose personal computer capable of implementing various functions by installing various programs, and the like.

Figure 12:
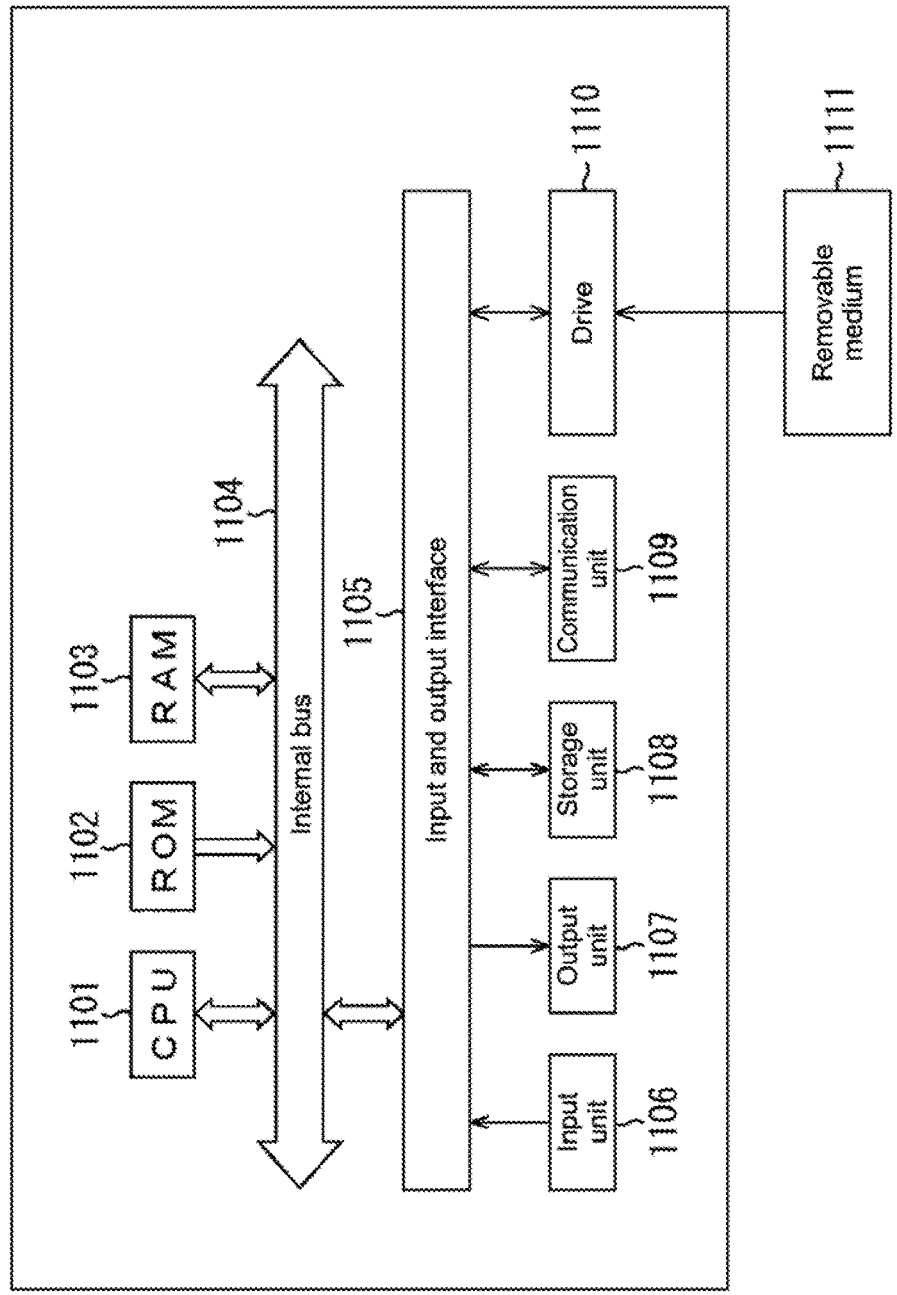
FIG. 12 A diagram for explaining a recording medium.

FIG. 12 is a block diagram showing an example of the structure of hardware of a computer which executes the series of processes described above by a program. In the computer, a CPU (Central Processing Unit) 1101, a ROM (Read Only Memory) 1102, and a RAM (Random Access Memory) 1103 are connected with one another via a bus 1104. To the bus 1104, an input and output interface 1105 is further connected. To the input and output interface 1105, an input unit 1106, an output unit 1107, a storage unit 1108, a communication unit 1109, and a drive 1110 are connected.

The input unit 1106 may include a keyboard, a mouse, a microphone, or the like. The output unit 1107 may include a display, a speaker, or the like. The storage unit 1108 may include a hard disk, a nonvolatile memory, or the like. The communication unit 1109 may include a network interface or the like. The drive 1110 drives a removable medium 1111 such as a magnetic disk, an optical disk, a magneto-optical disk, and a semiconductor memory.

In the computer configured as described above, the CPU 1101 loads a program stored in the storage unit 1108 via the input and output interface 1105 and the bus 1104 into the RAM 1103, for example, and executes the program, thereby performing the series of processes described above.

The program executed by the computer (CPU 1101) can be recorded in the removable medium 1111 and provided, for example, as a package medium or the like. Further, the program can be provided via a wired or wireless transmission medium such as a local area network, the Internet, and digital satellite broadcasting.

In the computer, the program can be installed into the storage unit 1108 via the input and output interface 1105 by loading the removable medium 1111 to the drive 1110. Further, the program can be received by the communication unit 1109 via a wired or wireless transmission medium and installed into the storage unit 1108. In addition, the program can be installed in advance into the ROM 1102 or the storage unit 1108.

It should be noted that the processes of the program executed by the computer may be performed on a time-series basis in the order described in the specification, or may be performed in parallel or at necessary timings, for example, at a timing when being called.

Further, in the specification, a system refers to an entire apparatus constituted of a plurality of apparatuses.

It should be noted that the effects described in the specification are merely examples and not limited thereto, and other effects may be obtained.

It should be noted that the embodiment of the present technology is not limited to the above embodiments and can be variously changed without departing from the gist of the present technology.

It should be noted that the present technology can take the following configurations.

(1) A signal processing apparatus, including
a signal transmission unit configured to perform classification for a signal to be transmitted and received between processing units that process an obtained signal, perform time division multiplexing for the signal in a group obtained by the classification, and transmit the signal.

(2) The signal processing apparatus according to (1) above, in which
the classification is performed depending on at least one feature of an update period, an update timing, a tolerable transmission delay of the signal.

(3) The signal processing apparatus according to (1) or (2) above, in which
the signal belonging to the group is subjected to time division multiplexing in such a manner that transmission is completed within an update period, transmission is completed within a range of tolerable delay, and transmission is performed with a minimum number of pins.

(4) The signal processing apparatus according to any one of (1) to (3) above, in which
out of signals belonging to different groups, signals that are transmitted within an update period and within a range of a tolerable delay are subjected to time division multiplexing and transmitted with the same pin.

(5) The signal processing apparatus according to any one of (1) to (4) above, in which
the group obtained by the classification includes a first group including an enable signal, a second group to which a signal synchronized with the enable signal belongs, a third group to which a signal a period of which is changed at an irregular interval belongs, and a fourth group to which a signal a period of which is not basically changed belongs.

(6) The signal processing apparatus according to any one of (1) to (5) above, in which
the group obtained by the classification includes a first group including an enable signal, a second group which includes data and a start flag of each sub carrier of OFDM, and to which a signal that requires several thousand data transmissions in one symbol of OFDM belongs, a third group to which a signal that indicates an internal state belongs, and a fourth group to which a signal that indicates a broadcasting parameter belongs.

(7) The signal processing apparatus according to (6) above, in which
the signal belonging to the first group is transmitted with one pin, the signal belonging to the second group is transmitted with a predetermined number of pins, the signal belonging to the third group and the signal belonging to the fourth signal are transmitted with the same predetermined number of pins.

(8) The signal processing apparatus according to any one of (1) to (7) above, in which
the signal is transmitted between the processing units in a single direction, and
the clock is transmitted between the processing units in a single direction.

(9) The signal processing apparatus according to any one of (1) to (7) above, in which
the signal is transmitted between the processing units bidirectionally, and
the clock is transmitted between the processing units bidirectionally.

(10) The signal processing apparatus according to any one of (1) to (7) above, in which
the signal is transmitted between the processing units bidirectionally, and the clock is transmitted between the processing units in a single direction.

(11) The signal processing apparatus according to any one of (1) to (7) above, in which
the processing units are operated by a clock from a clock generation unit that is disposed outside the processing units, generates the clock, and supplies the clock to the processing units.

(12) The signal processing apparatus according to any one of (1) to (11) above, in which
a second processing unit configured to receive the signal that is transmitted from a first processing unit and has been subjected to the time division multiplexing changes clocks from a clock transmitted from the first processing unit to a clock generated by the second processing unit and processes the signal transmitted from the first processing unit.

(13) A signal processing method, including the steps of:
performing classification for a signal to be transmitted and received between processing units that process an obtained signal; and
performing time division multiplexing for the signal in a group obtained by the classification and transmitting the signal.

(14) A program for causing a computer to execute the steps of:
performing classification for a signal to be transmitted and received between processing units that process an obtained signal; and
performing time division multiplexing for the signal in a group obtained by the classification and transmitting the signal.

(15) A signal processing apparatus, including:
a transmission unit configured to transmit data to a processing unit having the same structure; and
a reception unit configured to receive data from a processing unit having the same structure, in which
the transmission unit includes
a transmission data generation unit configured to perform time division multiplexing for data to be transmitted and generate a first transmission data,
a clock generation unit configured to generate a clock, and
a first synchronization unit configured to synchronize the first transmission data generated by the transmission data generation unit with the clock and transmit the data to the processing unit, and
the reception unit includes
a second synchronization unit configured to synchronize a second transmission data that has been subjected to time division multiplexing with a clock supplied from the processing unit,
a changing unit configured to change clocks from the clock from the processing unit to the clock generated by the clock generation unit, and
a transmission data restoration unit configured to demultiplex the second transmission data that has been subjected to time division multiplexing and clock changing by the changing unit, and restore the data.

(16) A signal processing apparatus, including:
a transmission unit configured to transmit data to a processing unit having the same structure; and
a reception unit configured to receive data from a processing unit having the same structure, in which
the transmission unit includes
a transmission data generation unit configured to perform time division multiplexing for data to be transmitted and generate a first transmission data,
a clock generation unit configured to generate a clock,
a first synchronization unit configured to synchronize the first transmission data generated by the transmission data generation unit with the clock, and
a first changing unit configured to change clocks from the clock to a clock supplied from the processing unit, and transmit the first transmission data to the processing unit, and
the reception unit includes
a second synchronization unit configured to synchronize a second transmission data that has been subjected to time division multiplexing from the processing unit with the clock supplied from the processing unit,
a second changing unit configured to change clocks from the clock from the processing unit to the clock generated by the clock generation unit, and
a transmission data restoration unit configured to demultiplex the second transmission data that has been subjected to time division multiplexing and clock changing by the changing unit, and restore the data.

(17) A signal processing apparatus, including:
a transmission unit configured to transmit data to a processing unit having the same structure; and
a reception unit configured to receive data from a processing unit having the same structure, in which
the transmission unit includes
a transmission data generation unit configured to perform time division multiplexing for data to be transmitted and generate a first transmission data, and
a first synchronization unit configured to synchronize the first transmission data generated by the transmission data generation unit with a clock generated by a clock generation unit that is provided outside, and transmit the data to the processing unit, and
the reception unit includes
a second synchronization unit configured to synchronize a second transmission data that has been subjected to time division multiplexing from the processing unit with the clock generated by the clock generation unit, and
a transmission data restoration unit configured to demultiplex the second transmission data that has been subjected to time division multiplexing and has been synchronized with the clock by the second synchronization unit, and restore the data.

DESCRIPTION OF REFERENCE NUMERALS

200 LSI
201 transmission data generation unit
202 clock generation unit
203 flip-flop
250 LSI
251 clock generation unit
252 flip-flop
253 changing unit
254 transmission data restoration unit
300 LSI
301 transmission data generation unit
302 clock generation unit
303 flip-flop
304 flip-flop
305 transmission data restoration unit
350 LSI
351 transmission data generation unit
352 clock generation unit
353 flip-flop
354 changing unit
355 flip-flop 356 changing unit
357 transmission data restoration unit
400 LSI
401 transmission data generation unit
402 flip-flop
450 LSI
451 flip-flop
452 transmission data restoration unit
471 clock generation unit

The invention claimed is:

1. A signal processing apparatus, comprising
a signal transmission unit configured to:
classify, into a group, at least one signal of a plurality of signals,
wherein the at least one signal is communicated between a first processing unit and a second processing unit, and
wherein the second processing unit processes the at least one signal;
execute a time division multiplexing operation on the at least one signal in the classified group,
wherein the at least one signal is transmitted, from the first processing unit to the second processing unit, within an updated period and in a range of tolerable delay, and
wherein the at least one signal is further transmitted, from the first processing unit to the second processing unit, with a minimum number of pins; and
transmit the at least one signal to the first processing unit.

2. The signal processing apparatus according to claim 1, wherein the classification is based on at least one of: the update period, an update timing, and the range of tolerable delay of the at least one signal.

3. The signal processing apparatus according to claim 1, wherein the plurality of signals are transmitted within the update period and within the range of tolerable delay, and
wherein the plurality of signals are transmitted with the same pin.

4. The signal processing apparatus according to claim 1, wherein the classified group includes:
a first group that comprises an enable signal,
a second group that comprises a first signal,
wherein the first signal is synchronized with the enable signal,
a third group that comprises a second signal,
wherein a first update period of the second signal is changed at an irregular interval, and
a fourth group that comprises a third signal,
wherein a second update period of the third signal is unchanged.

5. The signal processing apparatus according to claim 1, wherein the classified group includes:
a first group that comprises an enable signal,
a second group that comprises:
data and a start flag of each sub carrier of OFDM, and
a first signal that requires a plurality of data transmissions in one symbol of OFDM,
a third group that comprises a second signal that indicates an internal state, and
a fourth group that comprises a third signal that indicates a broadcasting parameter.

6. The signal processing apparatus according to claim 5, wherein
the enable signal of the first group is transmitted with one pin,
the first signal of the second group is transmitted with a plurality of pins,
the second signal and the third signal are transmitted with the same number of pins.

7. The signal processing apparatus according to claim 1, wherein
the at least one signal is communicated, between the first processing unit and the second processing unit, unidirectionally, and
a clock is communicated, between the first processing unit and the second processing unit, unidirectionally.

8. The signal processing apparatus according to claim 1, wherein
the at least one signal is communicated, between the first processing unit and the second processing unit, bidirectionally, and
a clock is communicated, between the first processing unit and the second processing unit, bidirectionally.

9. The signal processing apparatus according to claim 1, wherein
the at least one signal is communicated, between the first processing unit and the second processing unit, bidirectionally, and
a clock is communicated, between the first processing unit and the second processing unit, unidirectionally.

10. The signal processing apparatus according to claim 1, further comprising a clock generation unit configured to:
generate a clock signal, and
supply the clock signal to the first processing unit and the second processing unit,
wherein the first processing unit and the second processing unit are operated based on a clock.

11. The signal processing apparatus according to claim 1, wherein the second processing unit receives the at least one signal transmitted from the first processing unit,
wherein the second processing unit changes a first clock, transmitted from the first processing unit, to a second clock, and
wherein the second clock is generated by the second processing unit.

12. A signal processing method, comprising the steps of:
classifying, into a group, a signal communicated between a first processing unit and a second processing unit,
wherein the second processing unit processes the signal; and
executing a time division multiplexing operation on the signal in the classified group,
wherein the signal is transmitted, from the first processing unit to the second processing unit, within an updated period and in a range of tolerable delays, and
wherein the signal is further transmitted, from the first processing unit to the second processing unit, with a minimum number of pins; and
transmitting the signal to the first processing unit.

13. A non-transitory computer-readable medium having stored thereon computer-executable instructions that, when executed by a computer, cause the computer to execute operations, the operations comprising:
classifying, into a group, a signal communicated between a first processing unit and a second processing unit,
wherein the second processing unit processes the signal; and
executing a time division multiplexing operation on the signal in the classified group,
wherein the signal is transmitted, from the first processing unit to the second processing unit, within an updated period and in a range of tolerable delays, and wherein the signal is further transmitted, from the first processing unit to the second processing unit, with a minimum number of pins; and transmitting the signal to the first processing unit.

* * * * *